United States Patent
Alford

(10) Patent No.: US 9,956,943 B2
(45) Date of Patent: May 1, 2018

(54) ELECTROHYDRAULIC MOTOR VEHICLE BRAKE SYSTEM AND METHOD FOR VENTILATION OF THE SIMULATOR CIRCUIT THEREOF; METHOD FOR TESTING THE FUNCTIONALITY OF A FURTHER ELECTROHYDRAULIC MOTOR VEHICLE BRAKE SYSTEM, AND COMPUTER PROGRAM PRODUCTS FOR THE METHODS

(71) Applicant: Lucas Automotive GmbH, Koblenz (DE)

(72) Inventor: Nicholas Alford, Waldesch (DE)

(73) Assignee: Lucas Automotive GmbH, Koblenz (DE)

( * ) Notice: Subject to any disclaimer, the term of this patent is extended or adjusted under 35 U.S.C. 154(b) by 0 days. days.

(21) Appl. No.: 15/100,445

(22) PCT Filed: Oct. 17, 2014

(86) PCT No.: PCT/EP2014/072306
§ 371 (c)(1),
(2) Date: May 31, 2016

(87) PCT Pub. No.: WO2015/078635
PCT Pub. Date: Jun. 4, 2015

(65) Prior Publication Data
US 2016/0297413 A1    Oct. 13, 2016

(30) Foreign Application Priority Data

Nov. 28, 2013    (DE) .................. 10 2013 018 072

(51) Int. Cl.
*B60T 13/58*    (2006.01)
*B60T 8/40*    (2006.01)
(Continued)

(52) U.S. Cl.
CPC ............ *B60T 13/58* (2013.01); *B60T 8/4081* (2013.01); *B60T 13/66* (2013.01); *B60T 13/745* (2013.01);
(Continued)

(58) Field of Classification Search
CPC ...... B60T 13/58; B60T 13/745; B60T 13/221; B60T 13/222; B60T 7/042
(Continued)

(56) References Cited

U.S. PATENT DOCUMENTS 4,832,418 A    5/1989   Mattusch
8,540,324 B2   9/2013   Leiber et al.
(Continued)

FOREIGN PATENT DOCUMENTS

DE    102009054985 A1    1/2011
DE    102011081240 A1    4/2012
(Continued)

OTHER PUBLICATIONS

NPL english translation of DE102011085273a1.*
(Continued)

*Primary Examiner* — Yazan A Soofi
(74) *Attorney, Agent, or Firm* — MacMillan, Sobanski & Todd, LLC

(57) ABSTRACT

An electrohydraulic motor vehicle brake system is provided, having a hydraulic simulator circuit for generating a pedal feedback force, having a cylinder-piston unit and having an electromechanical actuator which acts on the cylinder-piston unit and which serves for generating a hydraulic pressure in at least one brake circuit, having a first fluid path with, arranged therein, a first valve device for the selective fluidic coupling of the cylinder-piston unit to the simulator circuit, and having a second fluid path with, arranged therein, a second valve device for the selective fluidic coupling of the
(Continued)

simulator circuit to an unpressurized hydraulic fluid reservoir. Also specified are a ventilation method for a brake system of said type, a testing method for a further electro-hydraulic motor vehicle brake system with only a first valve device, and a respective computer program product, with program code means, for carrying out one of the two methods when the computer program is executed on a processing unit.

29 Claims, 15 Drawing Sheets

(51) Int. Cl.
    *B60T 13/66*     (2006.01)
    *B60T 13/74*     (2006.01)
    *B60T 17/22*     (2006.01)
    *B60T 8/34*     (2006.01)
    *B60T 7/04*     (2006.01)

(52) U.S. Cl.
    CPC .......... *B60T 17/221* (2013.01); *B60T 17/222* (2013.01); *B60T 7/042* (2013.01); *B60T 8/34* (2013.01); *B60T 8/341* (2013.01)

(58) Field of Classification Search
    USPC ........................................................ 701/34.4
    See application file for complete search history.

(56) References Cited

U.S. PATENT DOCUMENTS

| | | | |
|---|---|---|---|
| 9,145,121 B2 | 9/2015 | Jungbecker et al. | |
| 9,227,609 B2 | 1/2016 | Gilles et al. | |
| 9,227,611 B2 | 1/2016 | Gilles | |
| 2010/0219026 A1* | 9/2010 | Fukasawa | B60T 8/4081 188/72.1 |
| 2010/0269683 A1* | 10/2010 | Anderson | B60T 7/042 91/369.1 |
| 2013/0213034 A1 | 8/2013 | Leiber | |
| 2013/0234501 A1 | 9/2013 | Leiber | |
| 2015/0343905 A1 | 12/2015 | Knechtges | |

FOREIGN PATENT DOCUMENTS

| | | |
|---|---|---|
| DE | 102011085273 a1 * | 5/2012 |
| DE | 102011085273 A1 | 5/2012 |
| DE | 102012221146 A1 | 5/2014 |
| DE | 102012025290 A1 | 6/2014 |
| EP | 0284718 A2 | 10/1988 |
| WO | 2006/111393 A1 | 10/2006 |
| WO | 2011141158 A2 | 11/2011 |
| WO | 2012059175 A1 | 5/2012 |
| WO | 2012062393 A1 | 5/2012 |
| WO | 2012152352 A1 | 11/2012 |
| WO | 2013030113 A1 | 3/2013 |

OTHER PUBLICATIONS

PCT International Search Report and the Written Opinion, Application No. PCT/EP2014/072306 filed Oct. 17, 2014, dated Jan. 15, 2015.

* cited by examiner

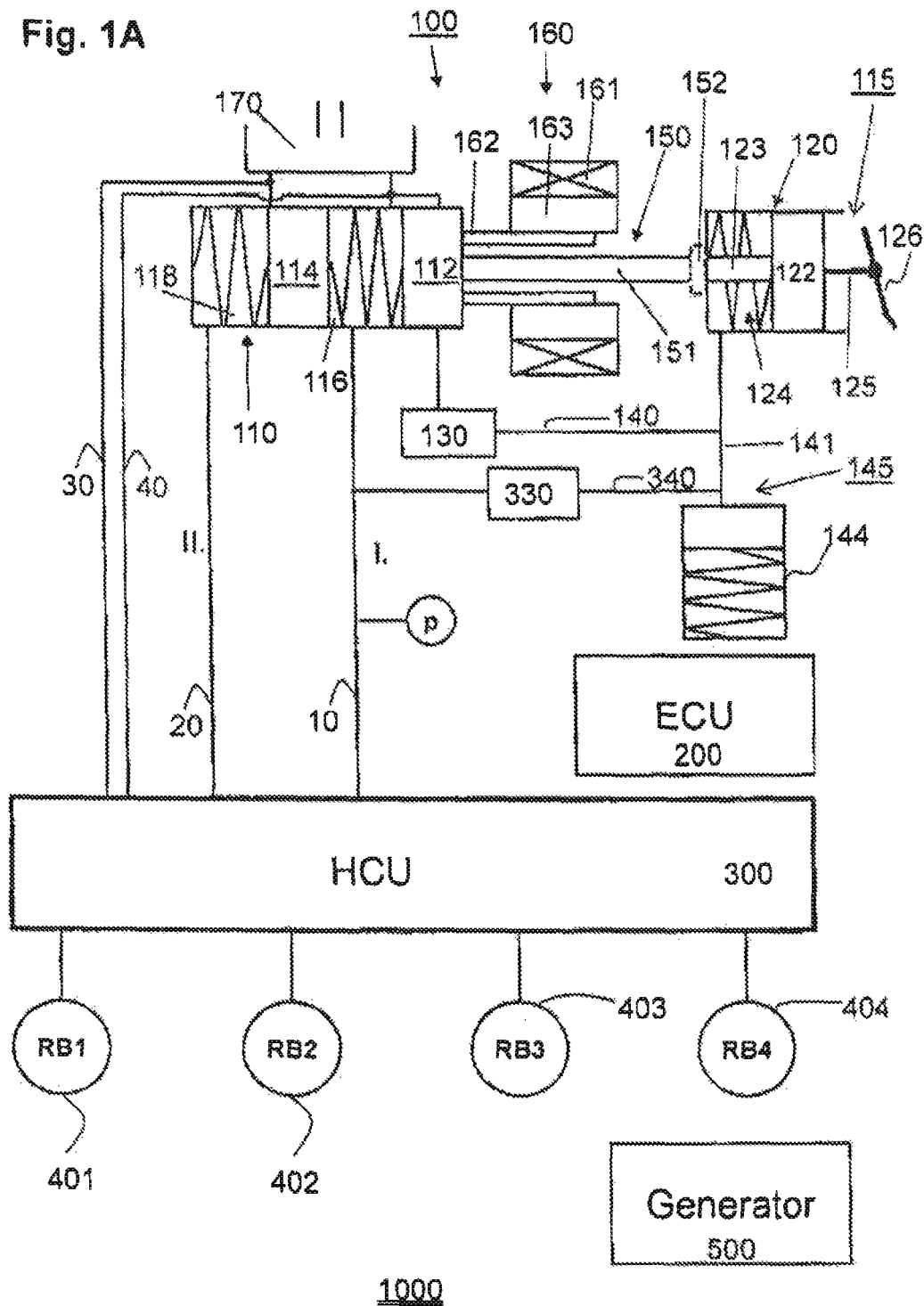

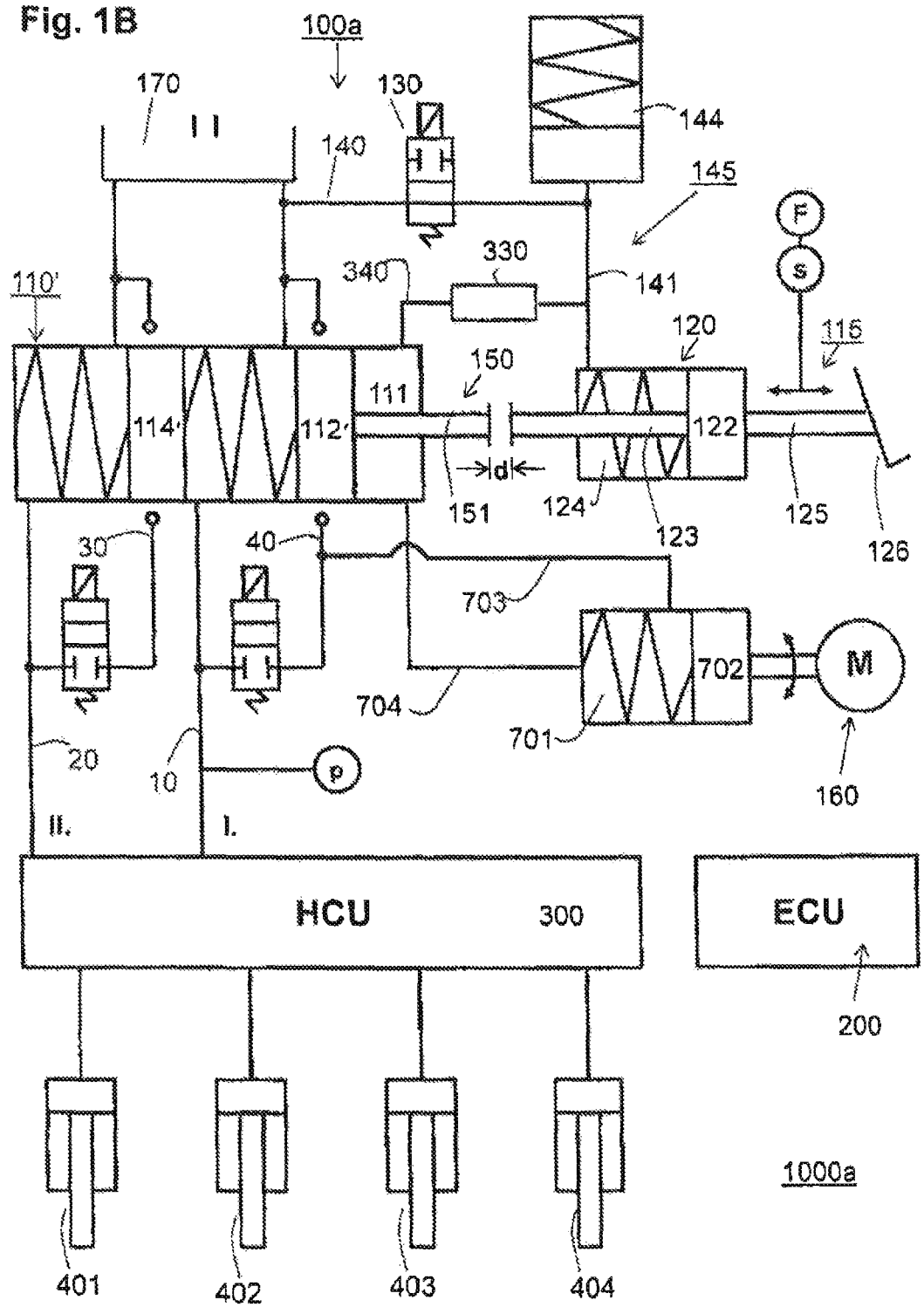

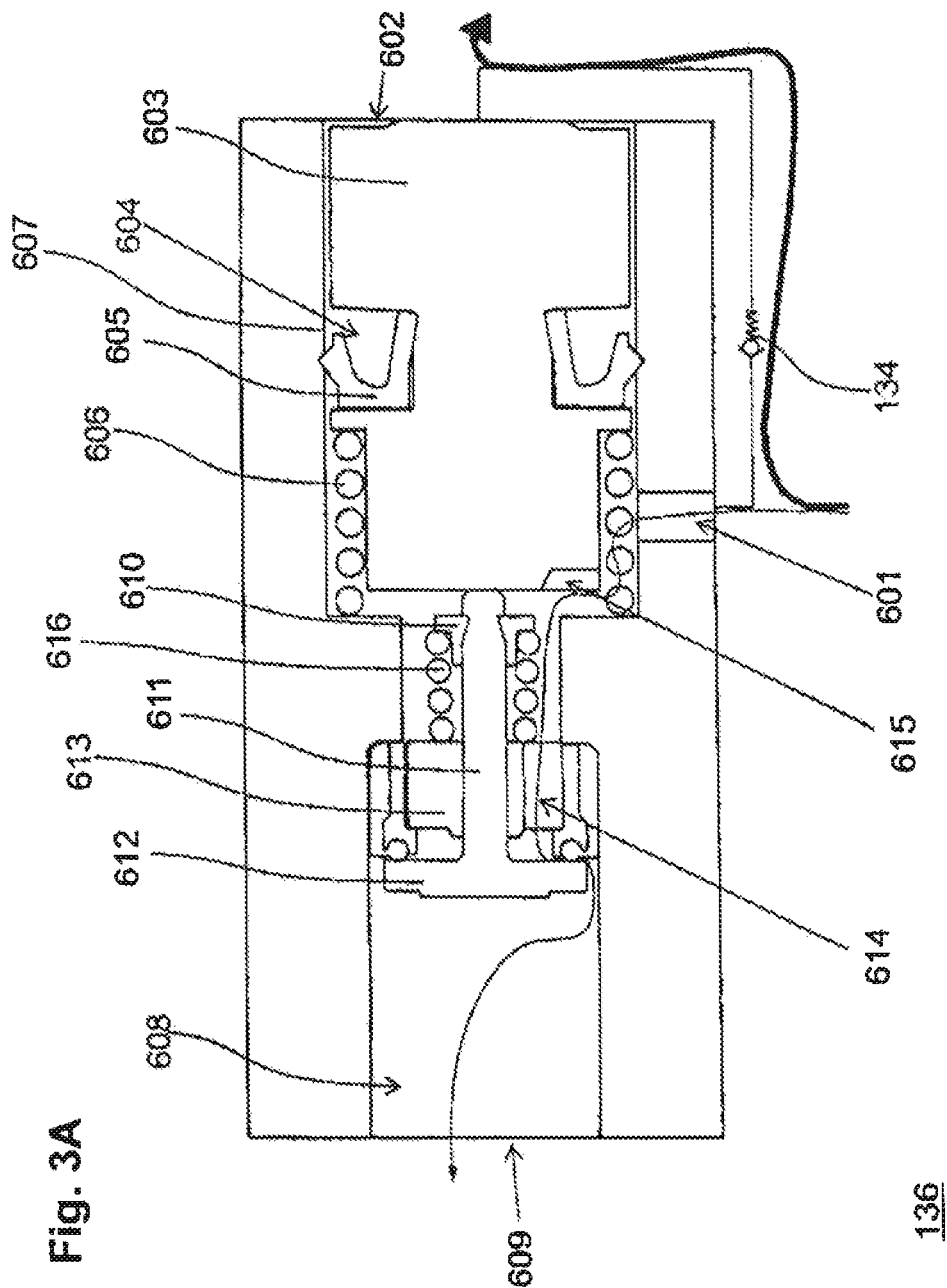

ELECTROHYDRAULIC MOTOR VEHICLE BRAKE SYSTEM AND METHOD FOR VENTILATION OF THE SIMULATOR CIRCUIT THEREOF; METHOD FOR TESTING THE FUNCTIONALITY OF A FURTHER ELECTROHYDRAULIC MOTOR VEHICLE BRAKE SYSTEM, AND COMPUTER PROGRAM PRODUCTS FOR THE METHODS

CROSS-REFERENCE TO RELATED APPLICATIONS

This application is the National Phase of International Application PCT/EP2014/072306 filed Oct. 17, 2014 which designated the U.S. and was published on Jun. 4, 2015 as International Publication Number WO 2015/078635 A1. PCT/EP2014/072306 claims priority to German Patent Application No. 10 2013 018 072.4, filed Nov. 28, 2013. Thus, the subject nonprovisional application claims priority to German Patent Application No. 10 2013 018 072.4, filed Nov. 28, 2013. The disclosures of these applications are incorporated herein by reference.

BACKGROUND OF THE INVENTION

The invention relates generally to the field of brake systems. Specifically, an electrohydraulic motor vehicle brake system is described. Modern vehicle brake systems operate according to the "brake-by-wire" principle. This means that a hydraulic pressure is built up at the wheel brakes independently of foot force via a hydraulic pressure generator (e.g. a piston-cylinder device with an electromechanical actuator acting on the piston). Brake systems of this kind comprise, apart from the hydraulic pressure generator, a brake pedal interface with a sensor system for detection of an actuation of a brake pedal, a simulator circuit connected to the brake pedal interface for simulation of a realistic pedal response force and a plurality of valves for regulating the pressure. The valves are frequently accommodated in a block-shaped hydraulic control unit. Such brake systems are known, for example, from WO 2006/111393 A1, WO 2012/062393 A1 and WO 2012/152352 A1.

Brake-by-wire brake systems have several advantages. For example, they are ideally suited for the installation of energy recovery systems. Furthermore, a build-up of brake pressure for an individual wheel can be controlled better by such brake systems and vehicle dynamics control programs (ABS, ASR, ESP programs) can be better integrated.

On the other hand, brake-by-wire brake systems comprise a plurality of electrically actuatable hydraulic valves, which are arranged in a complicated network of fluid paths connected to one another. The fluid paths in turn are often only supplied via a central hydraulic fluid reservoir with hydraulic fluid.

The servicing of such brake systems is complex on account of the plurality of valves and fluid guide paths. This is true, for example, of the ventilation of the brake system, as the wheel brakes, the simulator circuit and the hydraulic control unit have to be ventilated separately. The time outlay is correspondingly great in spite of the use of ventilation equipment, such as overpressure or vacuum equipment, for example. In the same way, detection of defective valves or of a leak in the brake system takes a lot of time, as normally all components of the simulator circuit and the brake circuits have to be checked individually in the context of fault location.

SUMMARY OF THE INVENTION

The invention provides a vehicle brake system in which the ventilation and checking of the brake system are made easier among other things. In addition, the invention provides a ventilation method and a test method for checking components of the brake system.

According to a first aspect, an electrohydraulic vehicle brake system is provided, which comprises: a hydraulic simulator circuit for generation of a pedal response force; a first cylinder-piston device and an electromechanical actuator acting on the first cylinder-piston device for generation of a hydraulic pressure in at least one brake circuit; a first fluid path having a first valve unit arranged therein for a selective fluidic connection of the first cylinder-piston device to the simulator circuit; and a second fluid path having a second valve unit arranged therein for a selective fluidic connection of the simulator circuit to an unpressurised hydraulic fluid reservoir.

The brake system can comprise at least one hydraulic brake circuit connectable fluidically to the first cylinder-piston device. Furthermore, the first end of the first fluid path can lead into the simulator circuit and the second end can lead into the at least one brake circuit. In this case the simulator circuit is connected fluidically via the first fluid path and the at least one brake circuit to the first cylinder-piston device. According to an alternative variant, the first fluid path can also lead directly (i.e. independently of the at least one brake circuit) into the first cylinder-piston device. In this case the simulator circuit can be connected fluidically via the first fluid path directly to the electromechanically actuatable first cylinder-piston device.

The first cylinder-piston device and the electromechanical actuator acting on the first cylinder-piston device can form an autonomous hydraulic pressure generator, which can build up a hydraulic pressure in the brake system independently of foot force. According to one implementation, the first cylinder-piston device can be formed as the main brake cylinder of the brake system, which can additionally still be actuated by foot force if the actuator fails. According to an alternative configuration, the first cylinder-piston device can be provided in addition to a main brake cylinder of the brake system for the generation of hydraulic pressure independently of foot force in the brake system.

According to a further configuration, the first cylinder-piston device can be connected fluidically to a second cylinder-piston device of the brake system, in order to build up a hydraulic pressure at the wheel brakes of the brake system. In this case the first cylinder-piston device can be provided to supply a hydraulic pressure for a hydraulic actuation of a piston of the second cylinder-piston device. By the hydraulic actuation of the piston of the second cylinder-piston device, a hydraulic pressure is then built up at the wheel brakes. The second cylinder-piston device can be formed as the main brake cylinder of the brake system, for example.

The first valve unit can be arranged parallel to the second valve unit. Correspondingly the first fluid path and the second fluid path can also be formed differently from one another. Specifically the first end of the first fluid path can lead into the simulator circuit and its second end can lead into the at least one brake circuit or directly into the first cylinder-piston device. Correspondingly the first end of the second fluid path can lead into the unpressurised hydraulic fluid reservoir and its second end into the simulator circuit. The first hydraulic path and the second hydraulic path can thus be connected fluidically via the simulator circuit. The first fluid path, the simulator circuit and the second fluid path can together form a fluid circuit of the brake system, which facilitates a fluidic connection of the first cylinder-piston device to the simulator circuit and/or to the unpressurised hydraulic fluid reservoir depending on the switching of the first valve unit and the second valve unit. With suitable activation of the first valve unit, the second valve unit and the actuator, the fluid circuit can be used to ventilate the brake system. However, the fluid circuit can also be used for testing brake system components, as described in greater detail below.

The simulator circuit can comprise a hydraulic pressure accumulator, which is connected fluidically to a brake pedal interface. The hydraulic pressure accumulator can be connected fluidically in this case to the pedal interface via a fluid path. The hydraulic pressure accumulator can be realised as a pressure vessel in the form of a piston-cylinder arrangement acted upon by spring force, wherein the piston taken up displaceably in the cylinder is pretensioned by a spring.

The first valve unit can be formed to be in a closed state in the unactuated state. In other words, the first valve unit can block the first fluid path in the unactuated state. The simulator circuit can thus be disconnected fluidically from the first cylinder-piston device. The first valve unit can be electrically actuatable. The first valve unit can be switched by electrical activation from a closed to an open state. The valve unit can comprise one or more electrically actuatable valves.

The second valve unit can be formed to be in an open state in the unactuated state. In the unactuated state the second valve unit can assume an open valve position, whereby the simulator circuit is connected fluidically to the hydraulic fluid reservoir. The second valve unit can comprise at least one electrically actuatable valve. The second valve unit can be switched by electrical activation of the at least one valve of the second valve unit to a closed state. The simulator circuit can be disconnected fluidically from the hydraulic fluid reservoir in this way.

The electrohydraulic brake system can also comprise an electric control apparatus or control apparatus system for the electrical activation of the first valve unit and for electrical activation of the electromechanical actuator. The control apparatus or control apparatus system can be formed to execute the following actuation steps (by electrical activation): switching of the first valve unit from a closed state to an open state, to connect the simulator circuit fluidically to the at least one brake circuit; and operation of the electromechanical actuator in order to displace hydraulic fluid from the cylinder-piston device via the first fluid path into the simulator circuit.

The control apparatus or control apparatus system can also be designed for the electrical activation of the second valve unit. The control apparatus can be designed to switch the second valve unit by electrical activation from an open state to a closed state before hydraulic fluid is displaced into the simulator circuit. The hydraulic fluid displaced via the first fluid path and the first valve unit into the simulator circuit can thus not flow into the hydraulic fluid reservoir via the second fluid path and the valve unit arranged in it. On the contrary, the fluid volume displaced by the actuator is stored in the hydraulic pressure accumulator of the simulator circuit.

The control apparatus or control apparatus system can also be formed to switch the second valve unit back to an open state following displacement of a predetermined volume of hydraulic fluid into the simulator circuit by electrical activation. In this way the fluid volume stored intermediately in the hydraulic pressure accumulator of the simulator circuit can flow via the second fluid path and the second valve unit arranged therein into the hydraulic fluid reservoir. The speed at which the second valve unit allows the volume of hydraulic fluid stored in the hydraulic pressure accumulator to flow via the second fluid path can be used to determine the flow properties of the second valve unit.

Alternatively to the aforementioned closure of the second valve unit, the second valve unit can remain switched in an open state during the operation of the electromechanical actuator. If the second valve unit should be in a closed state initially upon operation of the electromechanical actuator, the control apparatus can switch the second valve unit to an open state. Hydraulic fluid conveyed from the first cylinder-piston device can thus pass initially via the first fluid path into the simulator circuit. From there, the hydraulic fluid conveyed can be conducted away via the second fluid path into the hydraulic fluid reservoir. The simulator circuit and the pedal interface connected fluidically to the simulator circuit can thus be ventilated in this way independently of the driver. The conveying of hydraulic fluid via the first fluid path into the simulator circuit and from there via the second fluid path back into the hydraulic fluid reservoir can also be used for testing other valves connected downstream of the second valve unit.

The electrohydraulic brake system can further comprise at least a first detection device. The at least one first detection device can be formed to detect a hydraulic pressure built up in the brake circuit and/or the simulator circuit during the operation of the electromechanical actuator. The detection device can comprise at least one pressure sensor, which detects the pressure in the brake circuit and/or in the simulator circuit during the conveying of the hydraulic fluid. In addition or alternatively to this, the first detection device can comprise a sensor that detects a measured variable indicating a pressure (indirect pressure measurement).

The electrohydraulic brake system can further comprise at least one second detection device, which is formed to detect a volume of hydraulic fluid displaced from the first cylinder-piston device due to an operation of the electromechanical actuator. The second detection device can detect an actuator parameter in this case, which indicates an actuator operation and thus an actuation of the piston on which the actuator acts. The volume of fluid conveyed can be determined in a known manner from the detected piston actuation and a radius of the cylinder chamber of the first cylinder-piston device.

The electrohydraulic brake system can further comprise a comparison device, which is formed to compare the detected hydraulic pressure and the detected volume of fluid conveyed with a set pressure-volume characteristic. The set pressure-volume characteristic can reproduce the rise in pressure to be expected as a function of the displaced volume of fluid of a ventilated and fully functional simulator circuit. By comparison of the measured pressure-volume characteristic with the stored pressure-volume characteristic, the force response of the hydraulic pressure accumulator in the simulator circuit can be tested. In particular, the level of ventilation of the simulator circuit can be determined from the comparison of the detected pressure-volume characteristic with a stored pressure-volume characteristic. The set pressure-volume characteristic can be stored in a memory of the comparison device. In particular, the comparison device can be integrated in the control apparatus in the form of a software module.

The electrohydraulic brake system can further comprise at least a third valve unit arranged in the at least one brake circuit for the selective fluidic connection of a wheel brake to the first cylinder-piston device or the second cylinder-piston device. The at least one third valve unit can be electrically actuated via the control apparatus, in order to connect or disconnect fluidically each wheel brake of the brake system as required to or from the first cylinder-piston device or the second cylinder-piston device. For example, the control apparatus or control apparatus system can activate the third valve unit in brake operation of the brake system in such a way (e.g. activation according to a time multiplex method) that a quite definite hydraulic pressure can be set at the wheel brakes of the brake system.

However, the control apparatus or control apparatus system can also activate the third valve unit as part of a test method for the brake system or as part of an automatic brake system ventilation method, in order, if required, either to disconnect fluidically or to connect fluidically the wheel brakes from/to the first cylinder-piston device or, in a serial arrangement of the first and second cylinder-piston device, from/to the second cylinder-piston device. For example, the control apparatus or the control apparatus system can be formed to switch the at least one third valve unit from an open state to a closed state before operation of the electromechanical actuator as part of a brake system test method or a ventilation method. It can be ensured in this way that the hydraulic fluid conveyed from the hydraulic pressure generator does not reach the wheel brakes during a test function of the brake system. The hydraulic fluid conveyed from the first cylinder-piston device can thus be conveyed directly into the simulator circuit when the third valve unit is closed and the first valve unit is open. Alternatively to this, the third valve unit can also remain in an open state as part of a ventilation method. If the third valve unit was previously in a closed state, it can be switched to an open state by the control apparatus.

According to a second aspect, a method for checking a functionality of an electrohydraulic vehicle brake system is provided. The electrohydraulic vehicle brake system comprises a hydraulic simulator circuit for generation of a pedal response force, a first cylinder-piston device and an electromechanical actuator interacting with the first cylinder-piston device for the generation of a hydraulic pressure in at least one hydraulic brake circuit and a first fluid path having a first valve unit arranged therein for the selective fluidic connection of the first cylinder-piston device with the hydraulic simulator circuit. The method comprises the steps of switching the first valve unit from a closed state to an open state, in order to connect the hydraulic simulator circuit fluidically to the first cylinder-piston device, operation of the electromechanical actuator, in order to displace hydraulic fluid from the first cylinder-piston device via the first hydraulic fluid path into the simulator circuit, the detection of a hydraulic pressure prevailing on account of the displaced hydraulic fluid, and checking of the functionality of the electrohydraulic vehicle brake system on the basis of the hydraulic pressure detected.

The hydraulic pressure generated can be detected in this case in the first cylinder-piston device and/or in the brake circuit and/or in the simulator circuit. The hydraulic pressure can be detected during the operation of the actuator, in order to detect a pressure build-up in the brake circuit or simulator circuit, for example. In addition, the pressure can also be detected if the operation of the actuator is (temporarily) stopped and the piston is located in a position moved forward in the cylinder. The pressure generated by actuation of the piston as well as possible temporal pressure changes (e.g. a temporal pressure drop due to a leak in the simulator circuit) can be detected in this way. The pressure can be detected continuously or at predetermined intervals (e.g. at intervals of 0.1 seconds).

The method can also comprise the step of detection of the volume of hydraulic fluid displaced during the operation of the actuator. The detection of the volume of hydraulic fluid conveyed can, like the pressure detection, take place continuously or at set intervals (e.g. at intervals of 0.1 seconds). Furthermore, the detection of the volume of hydraulic fluid can take place substantially synchronously with the pressure detection. It is possible in this way to obtain a sequence of substantially contemporaneously recorded pressure values and fluid volume values during a piston actuation.

The step of checking can also comprise a comparison of the hydraulic pressure detected and the volume of hydraulic fluid detected with a set pressure-volume characteristic. The set pressure-volume characteristic An unambiguous pressure-volume relationship can be deduced from the substantially contemporaneously detected pressure values and fluid volume values. This detected functional relationship between pressure and volume conveyed can be compared with the stored characteristic. It can be established in this way whether deviations occur between the measured pressure-volume characteristic and the set pressure-volume characteristic. Conclusions can be drawn from the detected deviations between the measured pressure-volume characteristic and the set pressure-volume characteristic about the degree of ventilation or the wear of the simulator circuit.

The vehicle brake system can further comprise a second hydraulic fluid path having a second valve unit arranged therein for the selective fluidic connection of the simulator circuit to an unpressurised hydraulic fluid reservoir. The second valve unit can be an electrically actuatable valve unit. When unactuated (i.e. de-energised) it can assume an open valve position and in the energised state a closed valve position. In this case the method can additionally comprise the step of switching the second valve unit from an open state to the closed state before hydraulic fluid is displaced into the simulator circuit, in order to dam up the displaced hydraulic fluid in the simulator circuit. The hydraulic fluid conveyed from the cylinder-piston device is stored initially in a hydraulic pressure accumulator of the simulator circuit in this way. The pressure generated in this case can be detected as a function of the displaced volume of hydraulic fluid and used for checking the simulator circuit, as already described above.

The method can also comprise the step of opening of the second valve unit after a volume of hydraulic fluid has been displaced into the simulator circuit. The dammed up hydraulic fluid in the simulator circuit can then drain via the second fluid path and the second valve unit into the hydraulic fluid reservoir. The (temporal) decrease in pressure in the simulator circuit and in the at least one brake circuit (or in the cylinder of the pressure generator) can be detected. The flow properties of the second valve device (and of the second fluid path) can be tested on the basis of the detected temporal decrease in the hydraulic pressure.

The vehicle brake system can further comprise a second hydraulic fluid path having a second valve unit arranged therein for the selective fluidic connection of the simulator circuit to a hydraulic fluid reservoir, wherein in the case of the second valve unit a pressure-controlled valve unit is connected downstream. In order to determine a switching pressure of the pressure-controlled valve unit, for example, the method according to one test variant can provide that the second valve unit is not switched on operation of the actuator and thus remains in an open state. The hydraulic fluid conveyed from the cylinder can thus reach the valve inlet of the pressure-controlled valve unit via the first fluid path, via the brake circuit and via the second fluid path. The hydraulic fluid can then be dammed up in the test circuit until the pressure-controlled valve unit switches to an open state on account of the pressure that has built up. Only then can the hydraulic fluid from the test circuit flow into the hydraulic fluid reservoir and the pressure does not rise any further. The switching pressure of the pressure-controlled valve unit can be determined from the measured pressure rise and the sudden interruption in the pressure rise.

Furthermore, the brake system can comprise at least one brake circuit that can be connected fluidically to the first cylinder-piston device or to the second cylinder-piston device and at least one third valve unit arranged in the at least one brake circuit for the selective fluidic connection of a wheel brake to the first or second cylinder-piston device. In this case the method can additionally comprise the step of switching the third valve unit from an open state to a closed state before the actuator is operated. In this way no hydraulic fluid can get to the wheel brakes of the brake system during the test method. It can thereby be prevented that the wheel brakes are operated during the test method and thus distort the pressure detection.

According to another aspect, a method is provided for ventilation of a hydraulic simulator circuit of an electrohydraulic vehicle brake system. The brake system comprises a hydraulic simulator circuit for generation of a pedal response force, a first cylinder-piston device and an electromechanical actuator acting on the first cylinder-piston device for generation of hydraulic pressure in at least one brake circuit, a first fluid path having a first valve unit arranged therein for the selective fluidic connection of the at least one brake circuit to the simulator circuit and a second fluid path having a second valve unit arranged therein for the selective fluidic connection of the hydraulic simulator circuit to an unpressurised hydraulic fluid reservoir. The method comprises the following steps: opening of the first valve unit, in order to connect the first cylinder-piston device fluidically to the simulator circuit; opening of the second valve unit, in order to connect the simulator circuit fluidically to the hydraulic fluid reservoir, if the second valve unit was in a closed state; and operation of the electromechanical actuator in order to displace hydraulic fluid via the simulator circuit into the hydraulic fluid reservoir.

The vehicle brake system can further comprise at least one brake circuit connectable fluidically to the first cylinder-piston device or to the second cylinder-piston device and at least one third valve unit arranged in the at least one brake circuit for the selective fluidic connection of a wheel brake to the first or second cylinder-piston device. In this case, the method according to one variant comprises switching of the third valve unit from an open state to a closed state before the actuator is operated.

According to an alternative variant, the third valve unit can remain switched to an open state and the first valve unit to a closed state on operation of the electromechanical actuator. Hydraulic fluid is then conveyed initially to the wheel brakes of the at least one brake circuit. The first valve unit can then be opened in order to let the hydraulic fluid stored in the wheel brakes and/or brake circuits drain via the simulator circuit into the fluid reservoir.

The aforementioned test methods and ventilation methods can be executed during a brake-operation-free phase. Furthermore, all methods can be executed automatically and thus completely independently of the driver.

According to another aspect, a computer program product is provided, with program code means for executing the methods presented here when the computer program product runs on a processor. The computer program product can be stored on a computer-readable data carrier.

Various aspects of this invention will become apparent to those skilled in the art from the following detailed description of the preferred embodiment, when read in light of the accompanying drawings.

BRIEF DESCRIPTION OF THE DRAWINGS

FIG. 1A is an embodiment of an electrohydraulic vehicle brake system;

FIG. 1B is another embodiment of an electrohydraulic vehicle brake system;

DETAILED DESCRIPTION OF THE PREFERRED EMBODIMENTS

Figure 2:
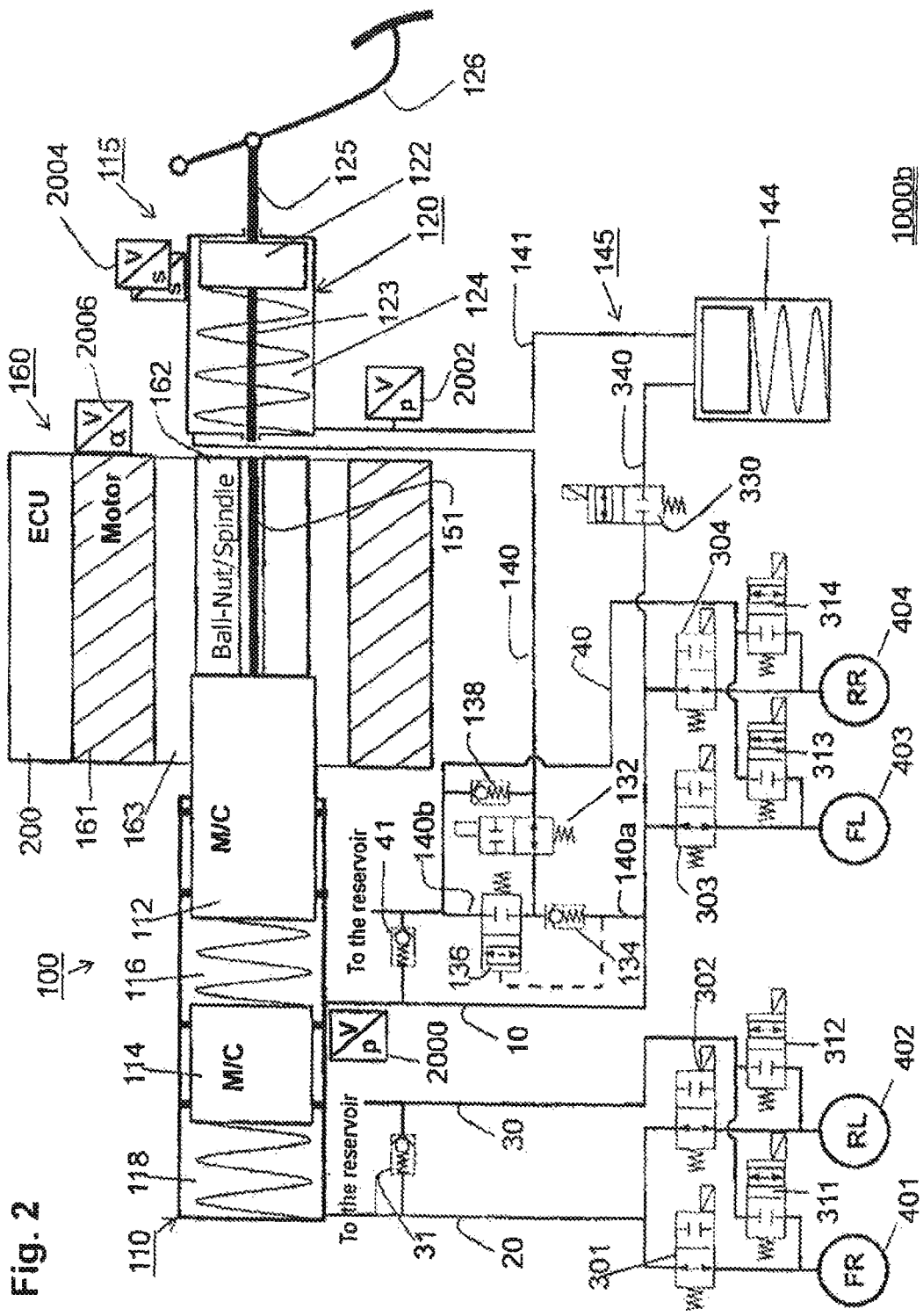
FIG. 2 is another embodiment of an electrohydraulic vehicle brake system.

Referring now to the drawings, FIG. 1A shows an electrohydraulic vehicle brake system 1000 with two brake circuits 10, 20. The vehicle brake system 1000 comprises a hydraulic pressure generator assembly 100, a first fluid path 340, a valve unit 330 arranged in the first fluid path 340, a second fluid path 140, 140a, 140b, a second valve unit 130 arranged in the second fluid path 140, 140a, 140b, a simulator circuit 145, an electronic control apparatus or an electronic control unit 200 (termed ECU below), a hydraulic control unit 300 (termed HCU below) and wheel brakes 401-404 respectively connected fluidically to a first brake circuit 10 and a second brake circuit 20. The brake system 1000 also comprises two return lines 30, 40, which are each fluidically connected at a first end to a corresponding brake circuit 10, 20 and lead at a second end into an unpressurised hydraulic fluid reservoir 170.

Optionally to this, the brake system can comprise a generator unit 500 for energy recovery. The generator unit 500 is designed to convert kinetic energy back into electrical energy in brake operation. The generator unit 500 is connected for this to at least one wheel 400, in order to convert the rotational movement into electrical energy. The generator unit 500 can also be connected to an energy store (e.g. a battery, not shown in FIG. 1A), which stores the electrical energy obtained.

The HCU 300 comprises a plurality of valve groups for hydraulic pressure regulation in the two brake circuits 10, 20. Deviating from the separate formation shown in FIG. 1 of HCU 300, the first valve unit 330 and the second valve unit 130, the first valve unit 330 and the second valve unit 130 can also be integrated into the HCU 300. Examples for the realisation of the valves and valve groups of the HCU 300 are described in greater detail further below in connection with FIG. 2.

The ECU 200 is designed at least to activate electrically actuatable valves of the HCU 300. It is also designed to activate the assembly 100. For this purpose the ECU 200 comprises control functions for the HCU 300 and the assembly 100. Alternatively to this, it is also conceivable that the activation functions for the assembly 100 and HCU 300 are each organised in separate electronic control sub-units and these sub-units accordingly interact in brake operation.

The structure and mode of operation of the hydraulic pressure generator assembly 100 are explained in greater detail below. First an implementation option for the assembly 100 is described in greater detail with reference to FIG. 1A. The hydraulic pressure generator assembly 100 comprises a main brake cylinder 110, a pedal interface 115 with a hydraulic cylinder 120, a power transmission device 150 and an electromechanical actuator 160. According to one variant, the unpressurised hydraulic fluid reservoir 170 for storing hydraulic fluid can be integrated into the assembly 100.

The main brake cylinder 110 is formed in the embodiment as a tandem main brake cylinder 110. A piston arrangement 112, 114 taken up displaceably in the main brake cylinder 110 comprises a first piston 112 (termed primary piston below) and a second piston 114 (termed secondary or floating piston below). Here a first hydraulic chamber 116 is defined by the end face (left end face) of the first piston 112 pointing in the travel direction and by the end face of the second piston 114 pointing opposite to the travel direction. Furthermore, a second hydraulic chamber 118 is defined by the end face of the secondary piston 114 pointing in the travel direction and the cylinder base. Both hydraulic chambers 116, 118 are respectively connected fluidically to a brake circuit 10, 20 of the brake system 1000 (i.e. to the first brake circuit 10 or to the second brake circuit 20). The hydraulic chambers 116, 118 also have a fluidic connection in a known manner to the unpressurised hydraulic fluid reservoir 170.

By actuation of the primary piston 112 and the secondary piston 114, hydraulic fluid can be conveyed from the two chambers 116, 118 into the respective brake circuits 10, 20 and a hydraulic pressure thus generated at the wheel brakes 401-404. The actuation can be carried out by the driver via the brake pedal 126 or via the electromechanical actuator 160, as described in greater detail further below. If the actuation of the piston arrangement 112, 114 is carried out exclusively via the actuator 160, then the assembly 100 is in normal operation. A braking process then takes place according to the brake-by-wire principle. If the actuation of the piston arrangement 112, 114 is by foot force via the brake pedal 126, on the other hand, the assembly 100 is in emergency operation (push-through operation).

The hydraulic pressure built up at the wheel brakes 401-404 in the context of normal operation or push-through operation can be relieved again via the return lines (fluid paths 30, 40). These lead directly into the unpressurised hydraulic fluid reservoir 170 and enable hydraulic fluid from the wheel brakes 401-404 to flow back via the fluid paths 30, 40 into the unpressurised hydraulic fluid reservoir 170.

It is understood that the present disclosure does not depend on the design details of the main brake cylinder 110. Instead of the tandem main brake cylinder 110 described here, the main brake cylinder can be formed in a "twin" arrangement, in which the hydraulic chambers 116, 118 assigned to the two brake circuits 10, 20 are arranged parallel to one another. Furthermore, the main brake cylinder 110 can have more than two hydraulic chambers 116, 118 and the brake system 1000 can comprise more than two brake circuits 10, 20.

The pedal interface 115 comprises the hydraulic cylinder 120, a piston 122 taken up displaceably in the hydraulic cylinder 120, a first plunger 123 and a second plunger 125. The first plunger 123 is attached to an end face of the piston 122 facing the travel direction. The first plunger 123 is arranged in this case coaxially with the piston 122. The first plunger 123 is provided to transmit an actuation of the brake pedal 126 to the power transmission device 150.

The second plunger 125 is attached at a first end to an end face of the piston 122 facing a brake pedal 126 (thus the end face facing away from the travel direction). The second plunger 125 is likewise arranged coaxially with the piston 122. The second end of the second plunger 125 is connected mechanically to the brake pedal 126. In this way a pedal actuation (i.e. pressing the brake pedal 126 down) can be transmitted to the piston 122, which is then displaced in the direction of travel (to the left in FIG. 1A). The pedal actuation (movement and the force applied for the movement) can be transmitted to the power transmission device 150 by the first plunger 123.

Together with the hydraulic cylinder 120, the end face of the piston 122 pointing in the travel direction also defines a hydraulic chamber 124, which is filled with hydraulic fluid. On actuation of the brake pedal 126, the piston 122 is displaced in the travel direction, due to which hydraulic fluid is displaced from the chamber 124. The displaced hydraulic fluid can be displaced in this case into the simulator circuit 145 or (at least partially) into the at least one brake circuit 10, 20 and the main brake cylinder 110, as described in greater detail below.

The power transmission device 150 is arranged between the main brake cylinder 110 and the hydraulic cylinder 120. It comprises at least one piston rod 151. The piston rod 151 is arranged coaxially with the piston arrangement 112, 114 of the main brake cylinder 110 and with the piston 122 of the hydraulic cylinder 120. It extends through a spindle 162 (formed as a hollow body) of the electromechanical actuator 160 and can be brought to abut at a first end (left end in FIG. 1A) on at least the primary piston 112 of the piston arrangement 112, 114. The second end of the piston rod 151 can also be brought to abut on the first plunger 123 of the pedal interface 115.

As also shown in FIG. 1A, the second end of the piston rod 151 is separated spatially from the first plunger 123 by a void (or gap) 152. This void 152 is maintained in normal operation of the assembly 100 due to a displacement carried out by the actuator 160 of the primary piston 112 and the piston rod 151 in the travel direction, even on depression of the brake pedal 126. The first plunger 123 thus does not come into contact with the piston rod 151 during normal operation of the assembly 100, and the actuation force acting on the brake pedal 126 cannot be transmitted to the piston rod 151.

In emergency operation of the assembly 100 the actuator 160 remains unactuated. The piston rod 151 is thus not displaced by the actuator 160. On depression of the brake pedal 126 the (small) void 152 between the first plunger 123 and the second end of the piston rod 151 can quickly be overcome. The first plunger 123 comes into contact with the piston rod 151. The piston rod 151 then transmits the displacement of the piston 122 in the direction of the piston rod 151 that is caused when the brake pedal 126 is pressed directly to the primary piston 112 of the main brake cylinder 110 (push-through principle). The primary piston 112 transmits the movement in turn to the secondary piston 114. By actuation of primary piston 112 and secondary piston 114 a hydraulic pressure can then be built up at the wheel brakes 401-404. Overall the mechanical power transmission device 150 described here facilitates a direct mechanical connection of the primary piston 112 to the piston 122 of the pedal interface 115 and the brake pedal 126 to build up hydraulic pressure during emergency operation (i.e. if no hydraulic pressure can be built up via the actuator 160).

According to the variant shown in FIG. 1A, the electromechanical actuator 160 is likewise arranged between the main brake cylinder 110 and the hydraulic cylinder 120. Main brake cylinder 110, electromechanical actuator 160 and hydraulic cylinder 120 are arranged in series and coaxially with a cylinder axis predetermined by the main brake cylinder 110. The electromechanical actuator 160 is provided to act on the piston arrangement 112, 114 of the main brake cylinder 110 in order to be able to build up a hydraulic pressure in the brake system 1000 independently of foot force. In normal operation of the assembly 100, the hydraulic pressure is built up exclusively via the electromechanical actuator 160.

The electromechanical actuator 160 comprises an electric motor 161 as well as a gear unit 162, 163 connected to the electric motor 161 to transmit the motor movement to the piston arrangement 112, 114 of the main brake cylinder 110. In the practical example, the gear unit is an arrangement of a rotatably supported nut 163 and a spindle 162 that is in engagement with the nut 163 (e.g. via rolling elements such as balls) and is movable in an axial direction. In other executions, toothed racks or other gear types can be used.

The electric motor 161 in the present embodiment has a cylindrical shape and extends concentrically to the transmission device 150. More precisely, the electric motor 161 is arranged radially externally with reference to the piston rod 151 of the transmission device 150. A rotor (not shown) of the electric motor 161 is connected non-rotatably to the gear nut 163 in order to set this in rotation. A rotary movement of the nut 163 is transmitted to the spindle 162 in such a way that an axial displacement of the spindle 162 results. The left end face of the spindle 162 in FIG. 1A can come into contact (if applicable via an intermediate element) with the right end face of the primary piston 112 in FIG. 1A and as a consequence of this displace the primary piston 112 (together with the secondary piston 114) to the left and thus convey hydraulic fluid into the brake circuits 10, 20. Conversely, the piston arrangement 112, 114 can be brought, when the spindle 162 travels back (thus moves to the right, opposite to the travel direction), into an unactuated state (starting position) via the hydraulic pressure prevailing in the chambers 116, 118 and/or the reset springs arranged in the chambers 116, 118.

The electromechanical actuator 160 is thus suitable for displacing the primary piston 112 of the main brake cylinder 110 autonomously (i.e. independently of foot force) in order to build up a hydraulic pressure at the wheel brakes 401-404 according to the brake-by-wire principle. The extent of the pressure build-up can be determined by at least one activation value of the ECU 200, which contains information on how strongly the actuator 160 should be actuated (and the spindle 162 displaced in the travel direction). The activation value can be determined on the basis of a sensor system (e.g. by means of path and/or force sensors) connected to the brake pedal 126 or the pedal interface 115.

In the variant of the assembly 100 shown in FIG. 1A, a hydraulic pressure can be built up in the at least one brake circuit 10, 20 via the main brake cylinder 110 and the piston arrangement 112, 144 taken up displaceably in it, in that the piston arrangement 112, 114 is actuated either via an actuation force applied by the electromechanical actuator 160 or by an actuation force applied by the driver to the brake pedal 126 and actuation force transmitted via the piston-plunger arrangement 122, 123, 125 of the pedal interface 115 and via the power transmission device 150. In the former operation mode of the piston arrangement 112, 114 the assembly 100 is in normal operation, in the latter operation mode in push-through operation.

According to an alternative variant, the electromechanical actuator 160 of the assembly 100 can act on a different cylinder-piston device from the main brake cylinder 110 to build up a hydraulic pressure at the wheel brakes 401-404 independently of foot force. In this case the cylinder-piston device is arranged in addition and by way of example parallel to the main brake cylinder 110, as is known from the printed publication WO 2011/141158 A2, the teaching of which is hereby included. Alternatively to this arrangement, the use of an electrohydraulic actuator (e.g. a hydraulic pump) is also conceivable, in order—following the brake-by-wire principle—to convey hydraulic fluid into the first and second brake circuit 10, 20. The present disclosure does not depend on the form and arrangement of the actuator 160 used to realise a brake-by-wire operation.

The simulator circuit 145 already mentioned comprises a hydraulic pressure accumulator 144, which is connected fluidically to the hydraulic cylinder 120 via a fluid path 141 (and a throttle valve or throttle check valve arranged therein). The hydraulic pressure accumulator 144 is realised as a piston-cylinder arrangement, wherein the piston taken up displaceably in the cylinder is pretensioned by a spring.

On actuation of the brake pedal 126 in normal operation, the hydraulic fluid conveyed from the hydraulic cylinder 120 is conducted via the fluid path 141 into the hydraulic pressure accumulator 144. The fluid flowing into the hydraulic pressure accumulator 144 displaces the piston pretensioned by the spring. The force to be applied for the displacement of the piston retroacts as pedal reset force on the brake pedal 126. In other words, the hydraulic pressure accumulator 144 generates a counterpressure, which retroacts on the piston 122 and on the brake pedal 126. In this way a counterforce acting on the brake pedal 126 is produced, which in brake-by-wire operation prevents the brake pedal 126 from being slack and gives the driver a realistic brake pedal sensation.

As shown schematically in FIG. 1A, the brake system 1000 comprises the first fluid path 340 with the first valve unit 330 arranged in it. The fluid path 340 and the valve unit 330 arranged therein are formed to connect the main brake cylinder 110 selectively fluidically to the simulator circuit 145. To do this, the first end of the first fluid path 340 can lead into the simulator circuit 145 (more precisely into the fluid path 141) and its second end can lead into the at least one brake circuit 10, 20 (for example into the first brake circuit 10, as shown in FIG. 1A). According to an alternative execution, the second end of the fluid path 340 can also lead directly into the main brake cylinder 110. It is only essential that a fluidic connection is realisable between the hydraulic pressure generator of the assembly 100 and the simulator circuit 145 via the first fluid path 340. In this connection it should be noted that, according to the variant of the electrohydraulic brake system 1000 shown in FIG. 1A, the hydraulic pressure generator is realised by the main brake cylinder 110, the piston arrangement 112, 114 arranged in the main brake cylinder 110 and the electromechanical actuator 160 acting on the piston arrangement 112, 114. It is understood that in the brake system described in the printed publication WO 2011/141158 A2, the hydraulic pressure generator is realised in the form of a cylinder-piston arrangement different from the main brake cylinder and an electromechanical actuator acting on this cylinder-piston arrangement.

The first valve unit 330 is formed to assume an open or a closed state depending on activation, in order to connect or disconnect the simulator circuit 145 fluidically from the first brake circuit 10 and/or from the main brake cylinder 110. In the unactuated state, the first valve unit 330 assumes a closed state, so that no hydraulic fluid can flow from the first brake circuit 10 into the simulator circuit 145. In particular, the first valve unit remains closed in push-through operation of the assembly 100, which prevents hydraulic fluid displaced from the main brake cylinder 110 from being able to flow into the simulator circuit 145.

The first valve unit 330 can be switched by electrical actuation via the ECU 200 to an open state, in order to connect the simulator circuit 145 fluidically to the first brake circuit 10, 20 and/or the main brake cylinder 110. However, switching of the first valve unit 330 to an open state does not take place during normal brake operation. The opening of the first valve unit 330 takes place as part of an automatic ventilation method or as part of a test method for the brake system 1000, but not during a braking process, as described further below in connection with FIGS. 4-12B. In other words, the first valve unit 330 remains unactuated and thus closed during a braking process in normal operation of the assembly 100 also.

The second valve unit 130 is in an open state in the unactuated state. The valve unit is open, for example, in push-through operation of the assembly 100. In this case hydraulic fluid can drain from the hydraulic cylinder 120 into the unpressurised hydraulic fluid reservoir 170. In normal operation of the assembly 100, the valve unit 130 can be switched to a closed state by electrical activation via the ECU 200. The simulator circuit 145 is disconnected hydraulically from the hydraulic fluid reservoir 170 by this. A hydraulic fluid displaced from the hydraulic cylinder 120 by actuation of the piston 122 is then conducted away via the fluid path 141 to the hydraulic pressure accumulator 144, which then produces a realistic pedal response, as already discussed above. However, the valve unit 130 can also be actuated as part of a brake system test method or as part of an automatic ventilation method of the brake system 1000, as described further below with reference to FIGS. 4-12B.

Overall the first fluid path 340 described here with the first valve unit 330 arranged in it and the second fluid path 140 with the second valve unit 130 arranged in it facilitate the realisation of a fluid circuit (termed test circuit below), which depending on the switching of the two valve units 130, 330 facilitates a fluidic connection of the main brake cylinder 110 to the simulator circuit 145 and a fluidic connection of the simulator circuit 145 to the unpressurised hydraulic fluid reservoir 170. In this way, on opening of the first valve unit 330 and of the second valve unit 130, a hydraulic fluid conveyed by the hydraulic pressure generator assembly 100 can flow via the first brake circuit 10 and via the first fluid path 340 connected fluidically to it into the simulator circuit 145. From there the hydraulic fluid can flow back via the second fluid path 140 into the unpressurised hydraulic fluid reservoir 170 and into the main brake cylinder 110 (the unpressurised hydraulic fluid reservoir 170 is connected fluidically in a known manner to the main brake cylinder 110). As will be described in greater detail below, automatic ventilation of the brake system 1000 (or of a part of the brake system) or different automatic test methods for testing the simulator circuit and/or other components of the brake system 1000 can be implemented by the fluid circuit realised by the first fluid path 340, the simulator circuit 145, the second fluid path 140.

FIG. 1B shows a brake system 1000a with an alternative configuration of a hydraulic pressure generator assembly 100a. The assembly 100a differs from the assembly 100 shown in FIG. 1A substantially in that a cylinder-piston device 701, 702 is provided in addition to a main brake cylinder 110' to generate hydraulic pressure, which device is connected fluidically on the outlet side to the main brake cylinder 110 via a fluid path 704 and is connected fluidically on the inlet side to a hydraulic fluid reservoir 170 via a fluid path 703. All other components of the assembly 100a, such as the electromechanical actuator 160, the pedal interface 115 and the power transmission device 150, for example, are substantially identical in their design and function to the assembly 100 shown in FIG. 1A. They are therefore identified by the same reference numbers and are not described again. The same applies to the other components of the brake system shown in FIG. 1B, such as the simulator circuit 145, the ECU 300, the HCU 300 with the brake circuits 10, 20 connected fluidically to the main brake cylinder 110, the return lines 30, 40 and the hydraulic fluid reservoir 170. The construction, arrangement and function of these components correspond to the construction, function and arrangement of the corresponding components in the brake system 1000 described in connection with FIG. 1A. Reference is made here to the corresponding text passages of the description of FIG. 1A.

The fluidic connection of the cylinder-piston device 701, 702 to the main brake cylinder 110' is described briefly below. The cylinder-piston device 701, 702 is connected fluidically on the outlet side via the fluid path 704 to a hydraulic chamber 111 defined by a rear side of a primary piston 112' (right end face of the primary piston 112' in FIG. 1B) and by a cylinder wall. The fluid line 704 is designed to transmit a hydraulic pressure generated in the cylinder-piston device 701, 702 to the primary piston 112'. The primary piston 112 (and consequently also a secondary piston 114' arranged after the primary piston 112') is then displaced (to the left in FIG. 1B) in consequence of a hydraulic pressure produced in the cylinder-piston device 701, 702 and present at the rear side of the primary piston 112. A hydraulic pressure can be built up in this way with the aid of the cylinder-piston device 701, 720 via the main brake cylinder 110' at the wheel brakes 401-404 of the brake system 1000a. The hydraulic pressure built up at the wheel brakes 401-404 corresponds in this case to the hydraulic pressure produced in the cylinder-piston device 701, 702.

It remains to be stated that in the present arrangement, in normal operation of the brake system 1000a, the primary piston 112' of the main brake cylinder 110' is actuated hydraulically by means of a separate pressure generator (cylinder-piston device 700, 701). In the configuration shown in FIG. 1A, on the other hand, in normal operation of the brake system 1000, the primary piston 112 is actuated by means of the electromechanical actuator 160 directly connecting to the primary piston 112. Furthermore, in the arrangement shown in FIG. 1B, the additional cylinder-piston device 701, 702 does not have any fluidic connection with one of the two brake circuits 10, 20 of the brake system 1000a. Thus in normal operation the hydraulic pressure produced in the cylinder-piston device 701, 702 is exclusively available for actuation of the pistons 112, 114 of the main brake cylinder 110.

In respect of the arrangement and actuation of the first valve unit 330 in the first fluid path 340 and of the arrangement and actuation of the second valve unit 130 in the other fluid path 140, let reference be made to the description of the first valve unit 330 and the second valve unit 130 of the brake system shown in FIG. 1A. The only difference from the arrangement shown in FIG. 1A consists in the fact that the second fluid path 340 is connected fluidically by its end facing away from the simulator circuit 145 not to one of the brake circuits 10, 20 of the brake system, but either directly to the cylinder-piston device 701, 702 or to the hydraulic chamber 111 (as shown in FIG. 1B) of the main brake cylinder 111'. It is common to both arrangements that the first fluid path 340 facilitates a direct fluidic connection of simulator circuit 145 and the pressure-producing cylinder-piston device 701, 702, 110, 112, 114.

Reference is now made to the brake system 1000b shown in FIG. 2. With reference to FIG. 2, the construction and mode of functioning of the first valve unit 330 and of the second valve unit 130 as well as the valves arranged in the brake circuit 10, 20 and in the return lines 30, 40 are described. The construction and mode of functioning of the assembly 100 corresponds to that in FIG. 1A and will not therefore be described again. In particular, components of the hydraulic vehicle brake system 1000b shown in FIG. 2 that correspond to those components shown in FIG. 1A or are similar in function to these are provided with the same reference numbers. Let reference be made in this connection to the description of FIG. 1A.

As shown in FIG. 2, the brake system 1000b (and the HCU 300) comprises a first group of four electrically actuatable valves 301-304 (termed third valve unit below), wherein each wheel brake 401-404 is assigned just one valve 301-304 of the third valve unit. The valve 301-304 assigned to each wheel brake 401-404 is designed to disconnect the wheel brake 401-404, depending on the switching state of the valve 301-304, hydraulically from the main brake cylinder 110 or to connect it hydraulically to the main brake cylinder 110. The time activation of the individual valves 301-304 takes place in this case via the ECU 200.

For example, the valves 301-304 can be actuated by the ECU 200 in a time multiplex operation. Each valve 301-304 (and thus each wheel brake 401-404) can be assigned at least one time slot for a valve actuation. This assignment does not rule out individual valves 301-304 being kept open or closed over several time slots or more than two valves being open at the same time. In this way the hydraulic pressure built up by the assembly 100 at the wheel brakes 401-404 can be adjusted individual to the wheel or individual to the group of wheels for the purpose of vehicle dynamics control (thus e.g. in ABS and/or ASR and/or ESP control mode) in operational braking (if the assembly 100 is in normal operation).

The brake system 1000b also comprises a second group of four electrically actuatable valves 311-314, wherein each wheel brake is assigned just one valve 311-314. The valves 311-314 are arranged in this case in the return lines of the wheel brakes 401-404, wherein the return lines of the wheel brakes 401-404 of a brake circuit 10, 20 lead at the valve outlet of the valves 311-314 into the return line 30, 40 assigned to the brake circuit 10, 20. The return lines 30, 40 lead into the hydraulic fluid reservoir 170. The two valves 311-314 each assume a closed valve position in the unactuated state, so that no hydraulic fluid can flow from the respective wheel brakes 401-404 into the unpressurised hydraulic fluid reservoir 170. As part of vehicle dynamics control (e.g. ABS and/or ASR and/or ESP control mode) they can be switched by electric activation of the ECU 200 to an open valve position, in order to allow hydraulic fluid to drain in a controlled manner via the respective brake circuits 10, 20 into the unpressurised hydraulic fluid reservoir 170.

The two brake circuits 10, 20 as well as the return lines 30, 40 assigned to the two brake circuits 10, 20 can each be connected fluidically to one another via a non-return valve 31, 41. The non-return valves 31, 41 are arranged here, seen from the main brake cylinder 110, ahead of the valves 301-304, 311-314 in a fluid path connecting the first brake circuit 10 to the first return line 40 and in a fluid path connecting the second brake circuit 20 to the second return line 30. The two non-return valves 31, 41 are arranged in such a way that they do not let any hydraulic fluid flow from the respective brake circuit 10, 20 into the respective return line 30, 40. On the other hand, however, hydraulic fluid can flow directly from the hydraulic fluid reservoir 170 via the non-return valves into the two chambers 116, 118 of the main brake cylinder 110. This can be the case, for example, if the piston arrangement 112, 114 is in the reverse stroke and a vacuum is created in the chambers 116, 118. It can be ensured in this way that the chambers 116, 118 of the main brake cylinder 110 are supplied with sufficient hydraulic fluid even after an actuation.

Following a description of the valves 31, 41, 301-304, 311-314, there now follows the description of the valves arranged in the first fluid path 340 and the second fluid path 140.

According to the embodiment of the brake system 1000b shown in FIG. 2, the first end of the first fluid path 340 leads into the first brake circuit 10 and the second end into the hydraulic pressure accumulator 144 of the simulator circuit 145. Furthermore, the first end of the second fluid path 140 leads into the hydraulic fluid reservoir 170 (the hydraulic fluid reservoir 170 is not shown in FIG. 2 and the opening of the second fluid path is only indicated schematically) and the second end into the hydraulic cylinder 120 of the pedal interface 115. According to an alternative configuration, the first fluid path 340 and/or the second fluid path 140 can lead with its respective second end into the fluid path 141 of the simulator circuit 145 also.

The first valve unit 330 arranged in the first fluid path 340 is realised in the embodiment of the brake system 1000b shown in FIG. 2 as an electrically actuatable valve 330. The valve 330 assumes a closed valve position in the unactuated state and thus blocks the first fluid path 340, so that no hydraulic fluid can get from the main brake cylinder 110 or from the first brake circuit 10 into the simulator circuit 145 via the first fluid path 340. The valve 330 remains closed during normal operation and during push-through operation of the assembly 100. It is actuated as part of automatic test methods or as part of an automatic ventilation method, as described in connection with FIGS. 4-12.

The second valve unit 130 arranged in the second fluid path 140 is realised in the embodiment of the brake system 1000b shown in FIG. 2 as an electrically actuatable valve 132. Connected downstream of the electrically actuatable valve 132 in the second fluid path 140 in the brake system 1000b shown in FIG. 2 are also a first pressure relief valve 134 and a second pressure relief valve 136. More precisely, the second fluid path 140 divides after the electrically actuatable valve 132 into a first branch 140a and a second branch 140b, wherein the first branch 140a leads into the first brake circuit 10 and the second branch 140b leads into the unpressurised hydraulic fluid reservoir 170 or into the return line 40 leading to the unpressurised hydraulic fluid reservoir 170. The first pressure relief valve 134 is arranged in the first branch 140a of the second fluid path 140. The second pressure relief valve 136 is arranged in the second branch 140b of the second fluid path 140. A third pressure relief valve 138 is also arranged in the brake system 1000b in parallel to the electrically actuatable valve 132 and to the second non-return valve 136.

The functions of the valves 132, 134, 136, 138 arranged in the second fluid path are described in greater detail below.

The electrically actuatable valve 132 arranged in the second fluid path 140 is formed to disconnect or connect the hydraulic cylinder 120 and the simulator circuit 145 fluidically from/to the unpressurised hydraulic fluid reservoir 170. Depending on the operating mode of the brake system (push-through operation, brake-by-wire or normal operation, test operation or ventilation of the brake system), the electrically actuatable valve 132 can be switched to an open or closed valve position. In the unactuated state (de-energised state) the electrically actuatable valve 132 assumes an open valve position. In push-through braking operation the valve 132 remains unactuated and thus functionless. Hydraulic fluid displaced from the hydraulic cylinder 120 in push-through operation can then flow via the open valve 132 to the first and second pressure relief valves 134, 136 arranged downstream and via these valves (depending on the hydraulic pressure in the first brake circuit 10) either flow into the first brake circuit 10 or drain into the hydraulic fluid reservoir 170.

In a braking process in normal operation of the assembly 100, on the other hand, the valve 132 is switched under current control to a closed valve position. No function is then assigned to the first pressure relief valve 134 and the second pressure relief valve 136, as they are completely fluidically disconnected by the valve 132 from the hydraulic cylinder 120. The first fluid path 140 is blocked by the electrically actuatable valve 132 and hydraulic fluid can neither flow from the hydraulic cylinder 120 of the pedal interface 115 into the main brake cylinder 110 and/or the unpressurised hydraulic fluid reservoir 170, nor in the reverse direction from the main brake cylinder 110 and/or the unpressurised hydraulic fluid reservoir 170 into the hydraulic cylinder 120. On the contrary, the hydraulic fluid displaced from the chamber 124 of the hydraulic cylinder 120 is conveyed via the throttle valve 143 into the hydraulic pressure accumulator 144, wherein the hydraulic pressure accumulator 144 simulates the feedback described above. On the return movement of the brake pedal 126, the valve 132 can pass once again into the open valve position in that the power supply for the valve 132 is interrupted.

The actuation of the valve 132 as part of a brake system test method or as part of automatic ventilation of the brake system 1000b is described in connection with FIGS. 4-12B.

The first pressure relief valve 134 and the second pressure relief valve 136 are provided for the pressure-controlled feed of additional hydraulic fluid from the hydraulic cylinder 120 into the at least one brake circuit 10, 20 of the brake system 1000b in push-through operation of the assembly 100.

The first pressure relief valve 134 is formed in the shape of a non-return valve. The non-return valve 134 is arranged so that in the open valve position it only allows hydraulic fluid to flow from the hydraulic cylinder 120 into the first brake circuit 10, but blocks it absolutely in the reverse direction. The first non-return valve 134 is formed as a spring-loaded non-return valve, which is limited to an overflow pressure of 0.3 bar. Thus in push-through operation, hydraulic fluid from the hydraulic cylinder 120 can always be fed via the valve 132 (this is open in push-through operation) and the non-return valve 134 connected in series into the first brake circuit (and via the main brake cylinder 110 connected fluidically to it also into the second brake circuit) if the hydraulic pressure produced by displacement of the piston 122 in the hydraulic cylinder 120 (which pressure is consequently also present at the valve inlet of the first non-return valve 134) is at least 0.3 bar higher than the hydraulic pressure produced in the main brake cylinder 110, which pressure is also present at the valve outlet of the first non-return valve 134. Furthermore, hydraulic fluid is pumped into the main brake cylinder 110 and into the two brake circuits 10, 20 (as long as the hydraulic pressure generated in the main brake cylinder 110 is still small) not only at the beginning of the push-through phase, but also during a pressure build-up phase. Overall, hydraulic fluid displaced from the hydraulic cylinder 120 in push-through operation is thus fed into the two brake circuits 10, 20 under pressure.

The additional hydraulic fluid fed into the brake circuits 10, 20 helps to overcome the clearance of the wheel brakes 401-404 quickly without much hydraulic fluid having to be conveyed from the main brake cylinder 110 into the two brake circuits 10, 20 for this. Due to the additional hydraulic fluid supplied, the actuation path of the piston arrangement 112, 114 (and thus of the brake pedal 126) is considerably shortened, especially in the initial push-through phase. This is because the initial actuation path (filling path) of the piston arrangement 112, 114, which is only necessary to displace hydraulic fluid from the main brake cylinder 110 to overcome the clearance at the wheel brakes 401-404, can be compensated for partially or completely by the additional fluid feed from the hydraulic cylinder 120.

In push-through operation, the piston 122 and the piston arrangement 112, 114 are actuated via the power transmission device 150 only by the actuation force applied to the pedal 126. Thus the feed pressure present at the first pressure relief valve 134 and the hydraulic pressure produced on account of the actuation of the piston arrangement 112, 114 react directly via the power transmission device 150 directly on the piston 122 and on the pedal 126 connected to it. In particular, to prevent a large part of the actuation force applied to the brake pedal 126 from being consumed for the generation of a feed pressure and thus no longer being available for the pressure build-up in the main brake cylinder 1110, the second pressure relief valve 136 is provided. This is arranged in the second branch 140b, which leads into the unpressurised hydraulic fluid reservoir 170. The second pressure relief valve 136 is arranged such that its valve inlet is connected fluidically to the valve inlet of the first pressure relief valve 134, while its valve outlet is connected fluidically to the unpressurised hydraulic fluid reservoir 170.

According to the variant shown in FIG. 2, the second pressure relief valve 136 is formed as a pressure-controlled pressure relief valve 136, which, upon a predetermined pressure being attained in the main brake cylinder 110 (for example 10 bar), switches from a closed state to an open state. On attaining the predetermined pressure in the main brake cylinder 110, the pressure relief valve 136 switches to an open valve position. The hydraulic fluid dammed up in the fluid path 140 and at the valve inlets of the valves 134, 136 during the push-through operation can then flow away without pressure into the unpressurised hydraulic fluid reservoir 170 via the second partial path 140 b.

Figure 3B:
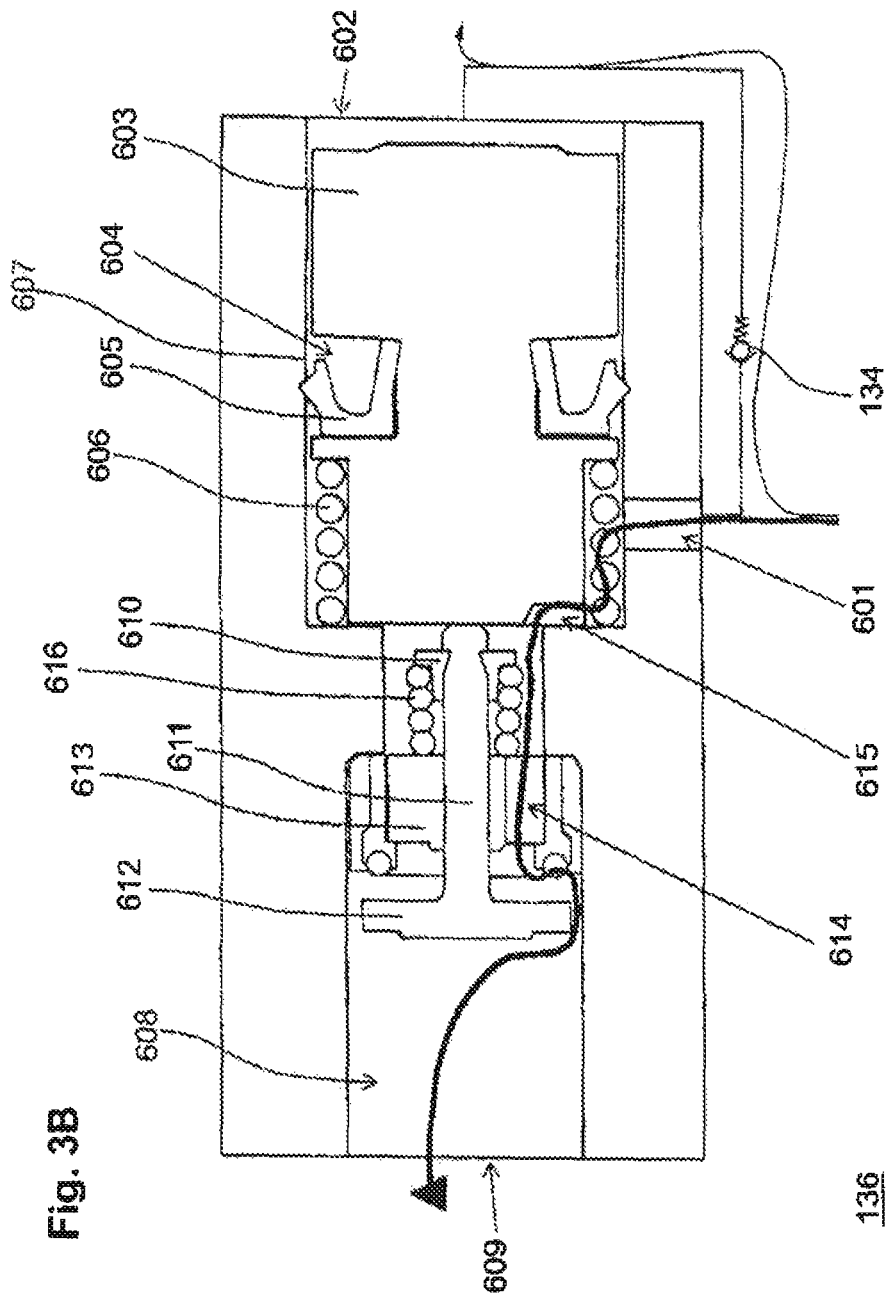
FIG. 3A/3B is an embodiment of a pressure-controlled valve unit of the electrohydraulic vehicle brake system.

The construction and the mode of functioning of the pressure-controlled second pressure relief valve 136b are described in greater detail with reference to FIGS. 3a and 3b.

The pressure relief valve 136 has a valve inlet 601, a valve outlet 609 and a pressure inlet 602. The valve inlet 601 is connected fluidically to the hydraulic cylinder 120. The valve outlet 609 is connected fluidically to the unpressurised hydraulic fluid reservoir 170. Furthermore, the pressure inlet 602 has a fluidic connection to the main brake cylinder 110. The pressure inlet 602 leads into a first valve hole 604, which takes up a first spring element 606 and a piston 603 with a seal element 605 displaceably. The spring element 606 is designed to pretension the piston 603 in the direction of the pressure inlet 602. The valve inlet 601 leads into the first hole 604 at its end facing away from the pressure inlet 602. The piston 603 has a corresponding first fluid passage 615 in the area of the valve inlet 601 in order not to block the valve inlet 601 on actuation of the piston. The first seal element 604 is arranged laterally between the piston 603 and the valve inner wall 607 in such a way that it separates the pressure inlet 602 from the valve inlet 601 fluidically at all times (thus in the unactuated and in the actuated valve state).

At its end lying opposite the pressure inlet 602, the first hole 604 leads into a second hole 608. The second hole 608 takes up a stopper-shaped valve element 613, which has a second fluid passage 614 and a hole for leading a valve tappet 611 through. The valve tappet 611 is connected at its end facing the valve outlet 609 to a closing element 612, which can be brought into contact with an end face of the stopper 613 facing the valve outlet. The valve tappet 611 is also provided at its end facing away from the valve outlet 601 with a spring bearing element 610. A second spring element 616 fixed between the spring bearing element 610 and a rear side of the stopper 613 brings the tappet 611 into contact with the piston 602. At the same time, the closing element 612 is pressed onto the stopper 613, due to which the second fluid passage 614 is blocked.

In the unactuated state (FIG. 3A), no hydraulic fluid can pass from the valve inlet 601 to the valve outlet 609, as the second fluid passage 614 is blocked by the closing element 612 that is in contact with the stopper 613. The hydraulic fluid dammed up at the valve inlet 601 and at the second passage 609 cannot lift the closing element 612 and release the passage. On the contrary, the fluid flows via the first non-return valve 134 into the main brake cylinder 110 and into the brake circuit 10.

The pressure produced in the main brake cylinder 110 acts directly on the piston 603, as this is connected fluidically via the pressure inlet 602 to the main brake cylinder 110 (and to the first brake circuit 10). If the pressure produced in the main brake cylinder 110 is sufficiently great, so that the force acting on the piston 603 (this is proportional to the pressure present and the area of piston exposed to the pressure) exceeds the spring force of the first and second spring device 606, 615, then the piston 602 and the valve tappet 611 brought into contact with the piston are displaced in the direction of the valve outlet (to the left in FIG. 3B). The second fluid passage 614 is thus released and hydraulic fluid can now flow via the first fluid passage 615 and the second fluid passage 614 free of pressure into the unpressurised hydraulic fluid reservoir 170 (cf. arrow in FIG. 3B, which marks the fluid path). The valve 136b is switched from a closed to an open valve position solely by the pressure produced in the brake circuit 10.

Overall the pressure-controlled valve 136 functions as a control valve in push-through operation, which determines for how long hydraulic fluid is fed from the hydraulic cylinder 120 into the brake circuit 10. In other words, the filling phase in push-through operation of the brake system can be determined via the pressure-controlled valve 136. The valve 136 also prevents an unnecessary damming up of hydraulic fluid at the first non-return valve 134, if, for example, the pressure produced in the main brake cylinder 110 during the push-through phase approaches or even exceeds the pressure produced in the hydraulic cylinder 120.

Back to FIG. 2. The third non-return valve 138 arranged in parallel to the second pressure relief valve 136 and to the electrically actuatable valve 132 is arranged in such a way that its valve inlet is connected fluidically to the valve outlet of the second non-return valve 136 and its valve outlet to the valve inlet of the electrically actuatable valve 132.

The third non-return valve 138 is limited to an overpressure of approximately 0.4 bar. It is formed to enable hydraulic fluid to flow back from the unpressurised hydraulic fluid reservoir 170 into the hydraulic cylinder 120 on the return movement of the brake pedal 126 (and thus on a return stroke of the piston 122). On the return stroke of the piston 120, a negative pressure can arise in the fluid path 140 and in the simulator circuit 145 relative to the unpressurised hydraulic fluid reservoir 170. Due to the arrangement of the third non-return valve 138, hydraulic fluid can flow past the electric valve 132 directly into the fluid path 140 in the return stroke. Since the third non-return valve 138 has a large valve cross section compared with the electrically actuatable valve 132, hydraulic fluid can be returned swiftly to the hydraulic cylinder 120 during a return stroke movement, in order to fill the hydraulic cylinder 120 with hydraulic fluid again. In particular, pumping of the hydraulic pressure accumulator 144 in the event of several short brake operations following on from one another quickly can thus be avoided in push-through operation. An exchange of hydraulic fluid between the unpressurised hydraulic fluid reservoir 170, the hydraulic cylinder 120 and the simulator circuit 145 connected fluidically to the hydraulic cylinder 120 can also take place via the third non-return valve 138 during normal operation of the brake system 1000.

Independently of the pressure-controlled valves 134, 136, 138 arranged in the second fluid path 140, a fluid circuit can be realised by the first fluid path 340 and the valve 330 arranged therein and the second fluid path 140 and the electrically actuatable valve 132 arranged therein (this is connected fluidically to the valve 330 only via the simulator circuit), which circuit, starting from the main brake cylinder 110, extends via the first fluid path 340, via the simulator circuit 145 and via the second fluid path 130 to the hydraulic fluid reservoir 170. This fluid circuit forms a "test circuit" for the brake system 1000, which can be used for automatic checking of the simulator circuit 145 and/or for checking the pressure valve arranged in the test circuit. The test circuit can also be used for automatic ventilation of the brake system 1000*b* or at least for automatic ventilation of parts of the brake system 1000*b*, as described in greater detail with reference to the following FIGS. 4-12B.

The brake system 1000*b* shown in FIG. 2 also comprises a sensor 2000 arranged in the main brake cylinder 110 or in the first brake circuit 10 for detecting the pressure in the main brake cylinder 110 or in the brake circuit 10, a sensor 2002 arranged in the simulator circuit 145 for determining the pressure in the simulator circuit 145, a path and/or force sensor 2004 arranged in the pedal interface 115 for determining the brake pedal actuation in brake operation and at least one sensor 2006 arranged on the actuator 160 for determining the actuator operation. The sensor 2006 can detect a motor parameter, such as the motor position during the operation. The actuation (thus displacement) of the primary piston 112 can be detected from the motor position and the known transmission ratio of the nut-spindle arrangement 162, 163 connected in series to the motor 161. Alternatively to this, a path sensor can also be present for the direct measurement of the spindle displacement in the event of an actuator operation, in order to detect from this the displacement of the primary piston 112 and of the secondary piston 114 initiated by the actuator 160. The volume of hydraulic fluid displaced from the main brake cylinder 110 can be calculated in turn from the displacement of the piston arrangement 112, 114.

Figure 4:
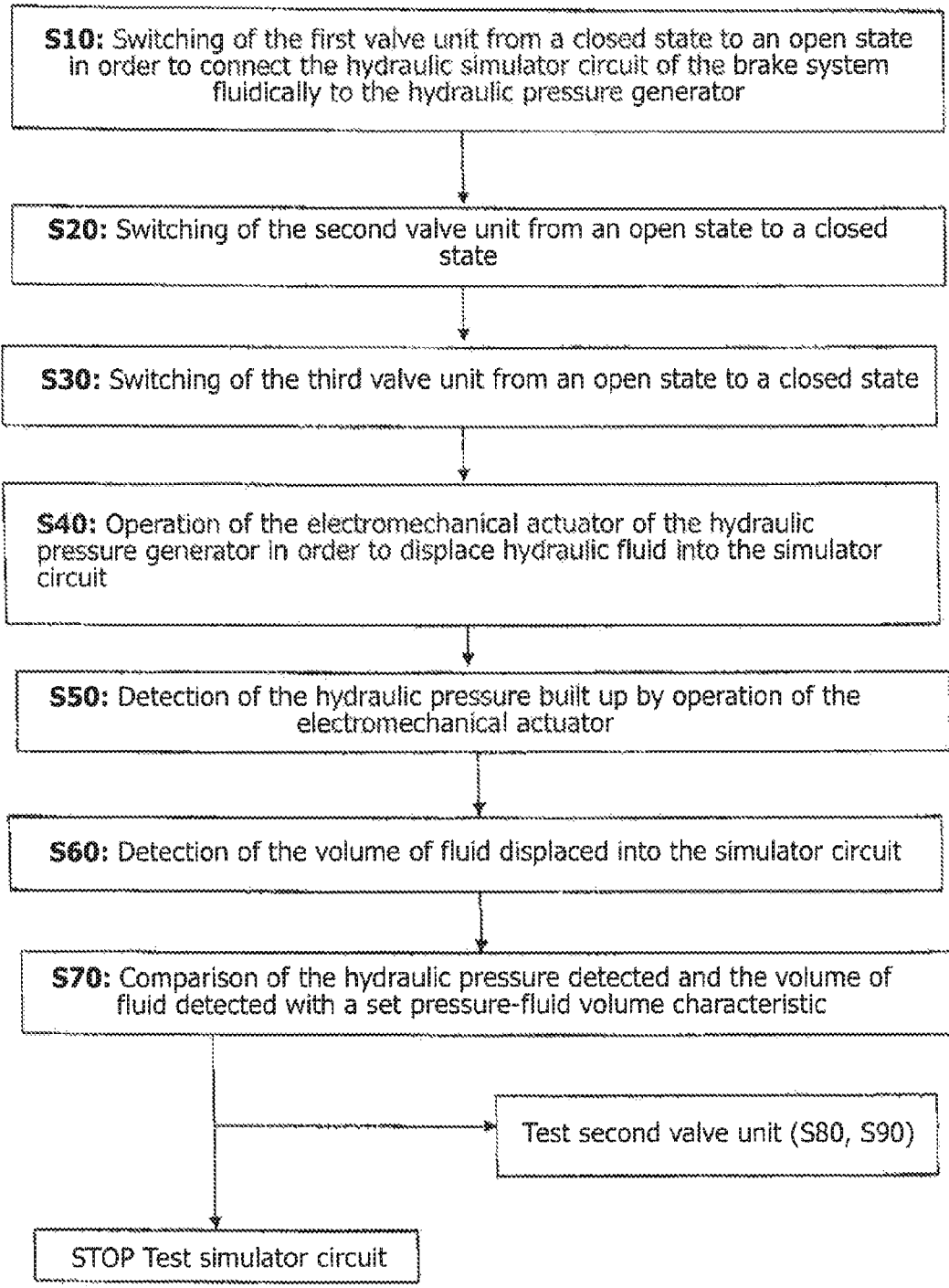
FIG. 4 is a flow chart for representing a test method for the vehicle brake systems according to FIGS. 1 and 2.
Figure 5:
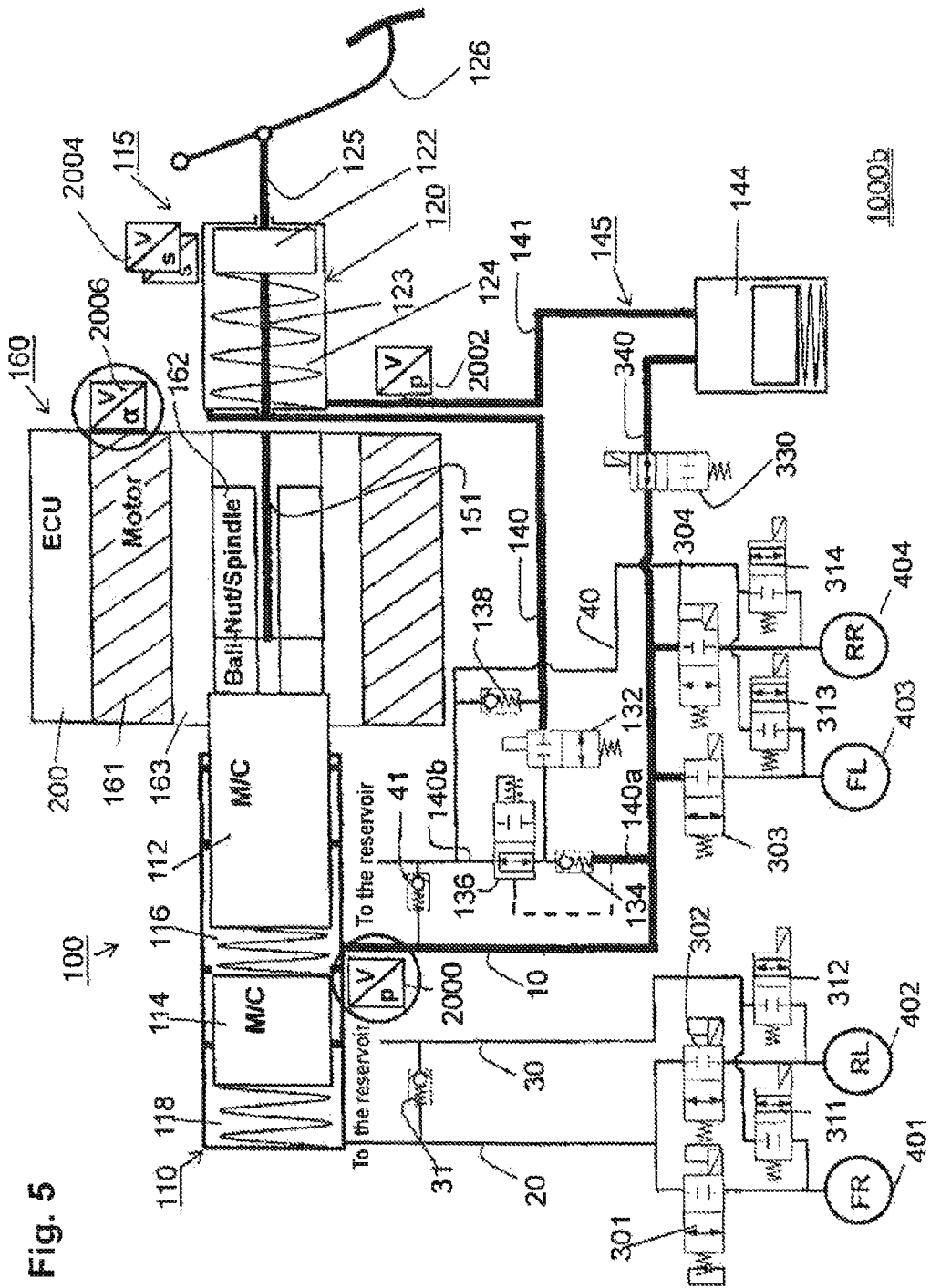
FIG. 5 is the vehicle brake system according to FIG. 2 for illustrating the test method according to FIG. 4.

An automatic test method for checking the functionality of the electrohydraulic vehicle brake systems 1000, 1000*a*, 1000*b* shown in FIGS. 1A/1B and 2 is now described with reference to FIGS. 4 and 5. Specifically, a test method for checking the simulator circuit 145 is described. FIG. 4 shows a flow chart, which clarifies the sequence of the method. FIG. 5 shows, with reference to the brake system 1000*b* illustrated in FIG. 2, the valve positions and the flow conditions of the hydraulic fluid in the brake system 1000*b*.

The automatic test method is implemented with the aid of the test circuit described above. The test method can be lodged with reference to control routines in the ECU 200, which comprises the sequential steps of activation of the valves and the operation of the electromechanical actuator 160.

The method is executed during a brake-operation-free phase of the brake system 1000, 1000*a*, 1000*b*. The valves 130, 301-304, 330 of the first, second and third valve unit are initially still unactuated in this configuration. Specifically the valve 330 of the first valve unit is in a closed valve position, the valve 130 of the second valve unit in an open valve position and the valves 301-304 of the third valve unit each in an open valve position, as illustrated in FIG. 2.

In a first step S10, the valve 330, which is arranged in the first fluid path 340, is first actuated electrically and thus switched from a closed valve state to an open valve state. In this way the pedal simulator circuit 145 and the pedal interface 115 are connected fluidically to the hydraulic pressure generator of the brake system (1000, 1000*a*, 1000*b*). In the embodiments described here of FIGS. 1A and 1B, the hydraulic pressure generator is realised by the main brake cylinder 110, the piston arrangement 112, 114 taken up in the main brake cylinder 110 and by the actuator 160 (FIG. 1A) acting on the primary piston 112 or by the cylinder-piston device 701, 702 and the actuator 160 (FIG. 1B) acting on the cylinder-piston device 701, 702. Alternatively the hydraulic pressure generator can also be realised by a cylinder-piston system such as described in WO 2011/141158 A2, for example.

In a second step S20, the electrically actuatable valve 130 arranged in the second fluid path 130 is also switched from an open valve position to a closed valve position. The simulator circuit 145 and the pedal interface 150 are disconnected fluidically from the hydraulic fluid reservoir 170 by this.

If the valves 301-304 of the third valve unit are in an open state, these are switched respectively from an open valve position to a closed valve position in a third step S30. The wheel brakes 401-404 are thus disconnected fluidically from the main brake cylinder 110, so that on operation of the actuator 160 no hydraulic fluid can flow into the wheel brakes 401-404. The wheel brakes 401-404 remain disconnected fluidically from the main brake cylinder 110 during the test method.

The actuation steps S10 to S30 described here can take place simultaneously or consecutively in the order described above or can be executed in another order. The actuation described of the valves 130, 301-304, 330 is also illustrated in FIG. 5.

In a subsequent fourth step S40, the electromechanical actuator 160 is now operated to displace hydraulic fluid from the hydraulic pressure generator into the simulator circuit 145.

In the brake system shown in FIGS. 1A and 2, the electromechanical actuator 160 moves the primary piston 112 and the secondary piston 114 connected to it in the main brake cylinder 110 in the travel direction (cf. displacement to left in FIG. 5), due to which hydraulic fluid can be displaced from the two chambers 116, 118 into the brake circuits 10, 20. The flow of the hydraulic fluid displaced from the main brake cylinder 110 in the brake system 1000*b* is represented in FIG. 5 by the thickly marked fluid paths. The hydraulic fluid displaced from the main brake cylinder 110 during actuator operation cannot get to the wheel brakes 401-404 on account of the closed valves 301-304. It flows instead via the first brake circuit 10 and via the first fluid path 340 into the hydraulic pressure accumulator 144, due to which this is filled with the hydraulic fluid conveyed from the main brake cylinder 110. Since the valve 130 in the second fluid path 140 is closed, no fluid can flow via the second fluid path 140 into the hydraulic fluid reservoir 170 either.

Simultaneously with the operation of the electromechanical actuator 160, the hydraulic pressure present in the main brake cylinder 110 or in the cylinder 701 is detected at the main brake cylinder 110 via the sensor 2000 (fifth step S50). In the ideal case, if the simulator circuit 145 does not contain any compressible air, the hydraulic pressure built up in the hydraulic pressure generator during the actuator operation corresponds to the counterpressure produced by displacement of the pretensioned piston in the hydraulic pressure accumulator 144. The pressure characteristic of the hydraulic pressure accumulator 144 can thus be checked. If there is air in the simulator circuit 145, the pressure rise can deviate from an expected pressure rise on account of the compressibility of the air. The deviation is a measure in this case of the level of ventilation of the simulator circuit 145.

To be able to test the simulator circuit 145, the hydraulic fluid displaced from the hydraulic pressure generator during the actuation of the pistons 112, 114, 702 is also detected by the sensor 2006 in a further sixth step S60. The detection of the fluid volume takes place in this case substantially simultaneously with the detection of the hydraulic pressure. The detection of the displaced fluid volume can be determined from a detected motor position, from the transmission ratio of the nut-spindle gear and from the cylinder diameter of the hydraulic pressure generator. Alternatively, the actuation path of the piston 112, 702 of the hydraulic pressure generator can be measured directly by a path sensor in the hydraulic pressure generator or by a path sensor mounted in the nut-spindle gear and the volume of fluid displaced can be determined from the actuation path and the cylinder diameter of the hydraulic pressure generator (from which the cylinder base of the hydraulic pressure generator can be determined in a known manner). The detection of pressure and displaced volume can take place continuously or incrementally at set time intervals. The pressure rise can be determined as a function of the fluid volume conveyed in the simulator circuit 145 from the detected measured value tuples "pressure" and "fluid volume".

The pressure-volume characteristic thus obtained can then be compared in a final seventh step S70 with a stored pressure-volume characteristic. The degree of ventilation of the simulator circuit 145 can be determined with reference to possible deviations of the detected pressure-volume characteristic from the stored characteristic. If the pressure rise on displacement of a hydraulic fluid volume during the test lies behind the pressure rise to be expected, for example, the proportion of air in the simulator circuit and thus the degree of ventilation of the simulator circuit 145 can be determined from this. Depending on the result, ventilation of the simulator circuit can then be carried out. A ventilation method is described below in connection with FIGS. 9 and 12B.

As soon as it is ensured that the simulator circuit 145 has been sufficiently ventilated, the piston-spring arrangement in the hydraulic fluid accumulator 144 can also be tested itself. The counterpressure detected in the hydraulic pressure generator is proportional to the spring force and to the displacement path of the spring-piston arrangement. Deviations in the pressure-volume characteristic can point to a reduced spring force and thus to signs of wear of the hydraulic pressure accumulator 144.

Figure 6:
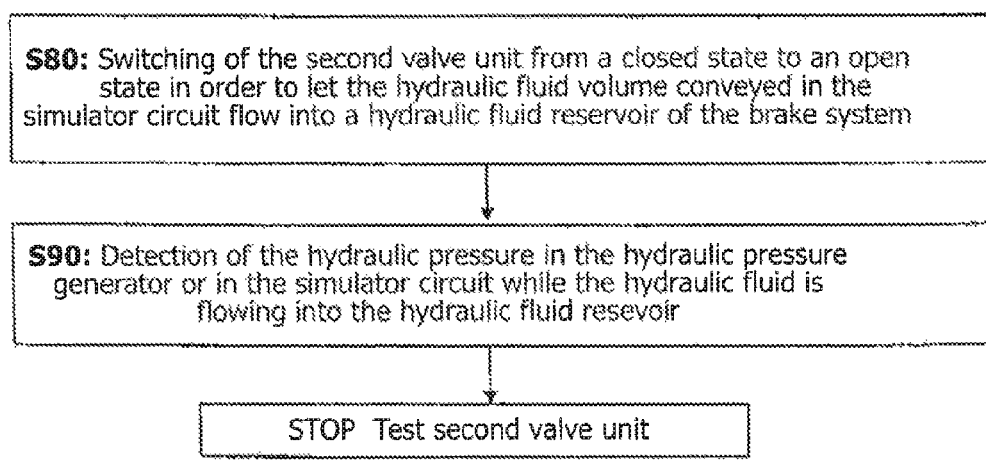
FIG. 6 is a flow chart for illustrating another test method for the vehicle brake systems according to FIGS. 1 and 2.

If a detected fluid volume has first been conveyed into the simulator circuit 145 as part of the simulator circuit test described above, the flow properties of the electrically actuatable valve 132 arranged in the second fluid path 140 can be tested in a further test. The corresponding flow chart is shown in FIG. 6.

The method for testing the flow properties of the valve 132 can take place following the simulator circuit test. In this connection the valve 132 is switched to an open valve position in an eighth step S80. The hydraulic fluid dammed up in the simulator circuit 145 can then flow via the hydraulic cylinder 120 of the unactuated pedal interface 115 that is connected fluidically to the simulator circuit 145, the second fluid path 140 and via the open valve 132 into the unpressurised hydraulic fluid reservoir 170. Since the hydraulic pressure built up in the hydraulic pressure generator for complete filling of the hydraulic pressure accumulator 144 is substantially higher than the switching pressure of 10 bar needed to release the pressure-controlled pressure relief valve 136, the pressure-controlled pressure relief valve 136 arranged downstream of the electrically actuatable valve 132 is in an open position, so that the fluid can flow into the hydraulic fluid reservoir 170.

During the return flow of the fluid into the hydraulic fluid reservoir 170, the falling hydraulic pressure in the simulator circuit 145 or in the hydraulic pressure generator is detected (step S90). Since the hydraulic fluid volume displaced into the simulator circuit 145 is known, it can be determined from the detection in time of the pressure drop in the main brake cylinder 110 how much fluid flows via the valve 132 per unit of time. In other words, the measured fall in time of the pressure (pressure drop rate) is a measure of how great a volume of fluid flows per unit of time through the valve cross section of the valve 132. The functionality of the valve 132 in the second fluid path 140 can be checked in this way.

The test method for determining the flow properties of the valve 132 can also be executed independently of the simulator circuit test. In this case, the valves 130, 301-304, 340 of the first, second and third valve unit are actuated, as described in the steps S10, S20, S30. Then the actuator 160 is operated, in order to convey a fluid volume into the simulator circuit 145 (step S40). The fluid volume conveyed is determined according to step S60. Then the valve 132 is opened and the pressure drop in the hydraulic pressure generator detected (steps S80 and S90).

Figure 7:
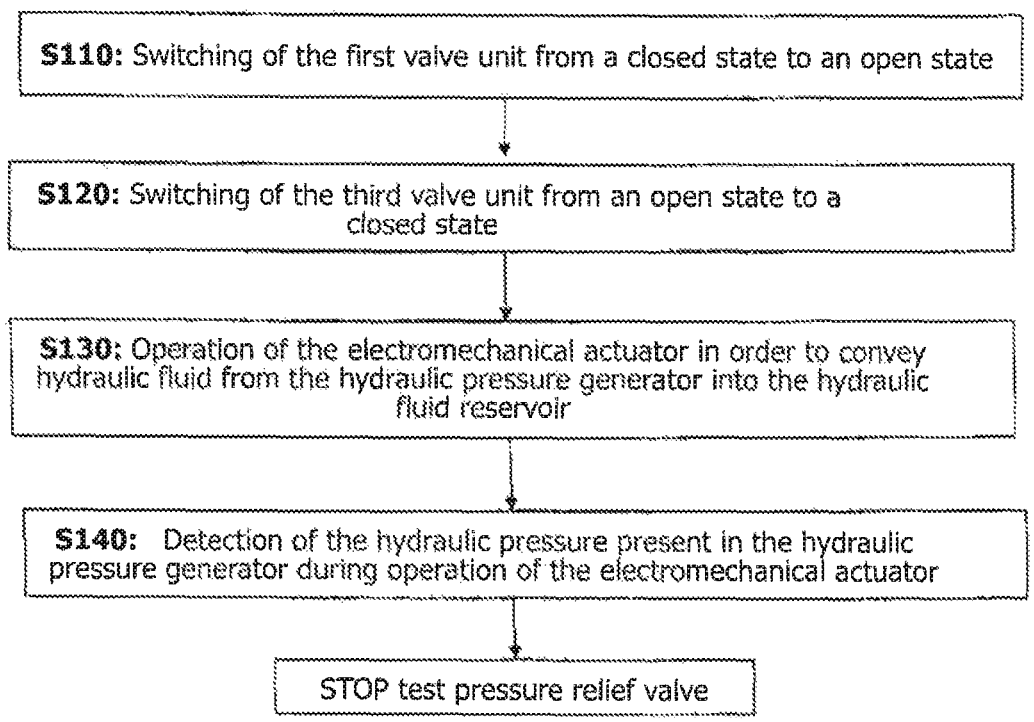
FIG. 7 is a flow chart for illustrating another test method for the vehicle brake systems according to FIG. 2.
Figure 8:
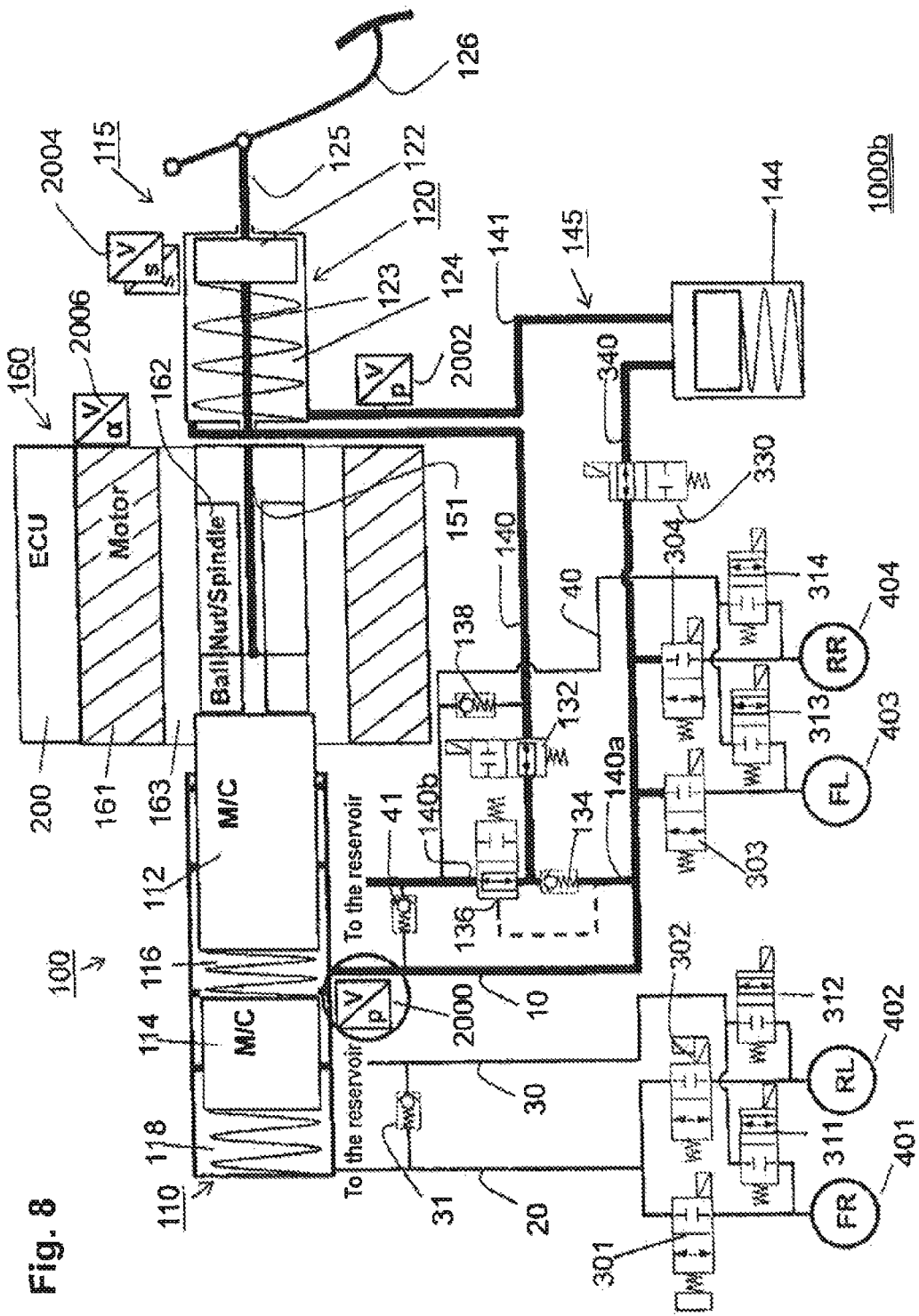
FIG. 8 is the vehicle brake system according to FIG. 2 for illustrating the test method according to FIG. 7.

Another test method for determining the switching pressure of the pressure-controlled pressure relief valve 136 is now explained with the aid of FIGS. 7 and 8. FIG. 7 shows a flow chart that illustrates the method steps of the test method. FIG. 8 shows the switching of the valves 130, 301-304, 330 and the flow path with reference to the brake system 1000b illustrated in FIG. 2.

As already described in connection with FIG. 2, the pressure-controlled pressure relief valve 136 and the non-return valve 134 are arranged in the second fluid path 140, in order to facilitate a pressure-controlled feed of hydraulic fluid from the hydraulic cylinder 120 into the brake circuits 10, 20 of the brake system 1000b during push-through operation.

To determine the switching pressure of the pressure-controlled pressure relief valve 136, the valve 330 is switched from a closed valve position to an open valve position in a first step S110. The valve 132 remains unactuated and thus in an open valve position. If the valve 132 should be located in a closed valve position before execution of the test, the valve is switched to an open valve position.

In a subsequent second step S120, the valves 301-304 of the third valve unit are also actuated and switched to a closed valve position. Thus the wheel brakes 401-404 are disconnected fluidically from the main brake cylinder 110 during the test.

Disconnection of the wheel brakes 401-404 during the test is necessary so that no hydraulic fluid gets into the wheel brakes 401-404. If hydraulic fluid were to reach the wheel brakes 401-404 additionally during the test, the switching pressure of the pressure relief valve 136 could not be determined reliably on account of the actuation of the wheel brakes 401-404 then taking place. The steps S110, S120 can be executed simultaneously or according to a set time sequence.

In a following third step S130, the electromechanical actuator 160 is then operated, which moves the piston arrangement 112, 114 in the main brake cylinder 110 or the piston 702 in the cylinder 701 in the direction of travel, in order to convey hydraulic fluid from the hydraulic pressure generator to the hydraulic fluid reservoir.

In the brake system shown in FIG. 2, the hydraulic fluid conveyed on operation of the electromechanical actuator 160 passes first into the brake circuits 10, 20. Due to the closed valves 301-304, the hydraulic fluid displaced from the chambers 116, 118 can only be moved via the first fluid path 340 and the open valve 330 to the hydraulic pressure accumulator 144. From the hydraulic pressure accumulator 144 the hydraulic fluid can pass into the second hydraulic fluid path 140 via the pedal interface 115. The hydraulic fluid conveyed in the second hydraulic path 140 can also reach the inlets of the valves 134, 136 via the second valve 132. In the present test method, approximately the same hydraulic pressure is present at the non-return valve 134 as in the main brake cylinder 110. It thus remains closed. The pressure-controlled pressure relief valve 136 is initially likewise closed. The fluid conveyed from the main brake cylinder 110 thus dams up in the test circuit (first fluid path 340, simulator circuit 145, second fluid path 140).

With increasing actuator operation, the pressure in the main brake cylinder and in the test circuit rises continuously. The temporal rise in the pressure is detected in a further step S140 at the main brake cylinder by the sensor 2000 (or in the test circuit by the sensor 2002).

The valve 136 switches to an open valve position (cf. FIG. 8) precisely when the hydraulic pressure present in the main brake cylinder 110 reaches the switching pressure of the valve 136 (thus 10 bar). As soon as the pressure relief valve 136 passes from the closed valve position to the open valve position, the hydraulic fluid backed up at the inlets of the valves 134, 136 can flow via the open valve 136 and the partial path 140b into the fluid reservoir 170. Following the opening of the valve 136, upon further displacement of the piston arrangement 112, 114 the hydraulic pressure in the main brake cylinder 110 and in the simulator circuit 145 is increased only insignificantly. This levelling off of the pressure on reaching a certain pressure level in the main brake cylinder can be detected by the sensor 2000. It is a measure of the switching pressure of the pressure-controlled pressure relief valve 136.

By recording the pressure during operation of the electromechanical actuator 160 (cf. FIG. 8, in which the pressure detection device 2000 is circled), the switching pressure at which the pressure-controlled pressure relief valve 136 switches from a closed valve position to an open valve position can thus be determined. In particular, the tightness of the pressure-controlled pressure relief valve 136 can also be tested by the described test. For example, in the case of a leaking valve 136, hydraulic fluid can flow from the first brake circuit 10 or the main brake cylinder 110 via a control channel (dashed line at valve 136 in FIG. 8) and via the valve 136 directly into the hydraulic fluid reservoir 170, due to which a pressure build-up in the brake circuit 10 would be considerably obstructed.

The test methods described here are each executed during a brake-operation-free phase. According to one implementation, the test methods described here can be executed when the vehicle is stationary. This can be the case, for example, if the vehicle is stopped or if the vehicle is in a stationary position (e.g. at a traffic light) during a journey. If a movement of the vehicle is detected in this connection and if a test method is just being executed, the test method is interrupted or aborted in order not to influence the operability of the brake system 1000b. The test methods described also run entirely automatically. They can be repeated at regular intervals or also at the request of the driver.

The test circuit described in connection with FIGS. 1A, 1B and 2 can also be used to ventilate the brake system 1000, 1000a, 1000b or to ventilate parts of the brake system 1000, 1000a, 1000b. The automatic ventilation of the brake system 1000, 1000a, 1000b or of the simulator circuit 145 shown in FIGS. 1A and 2, which can be executed with the aid of the hydraulic pressure generator assembly 100 independently of the driver and thus entirely automatically, is now described below with reference to two examples.

Figure 9:
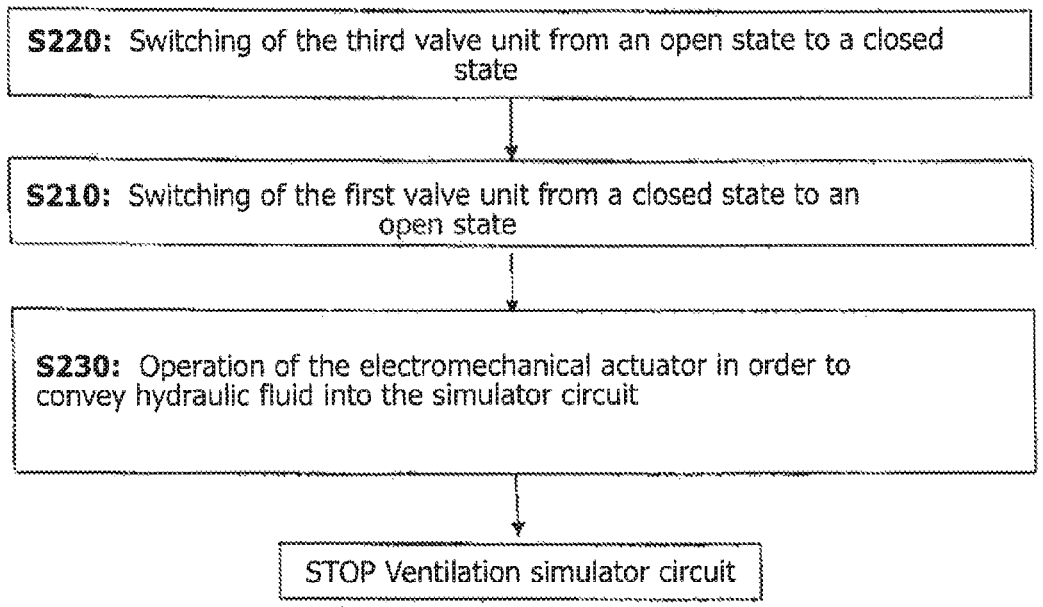
FIG. 9 is a flow chart for illustrating a ventilation method for the vehicle brake systems according to FIGS. 1 and 2.
Figure 10:
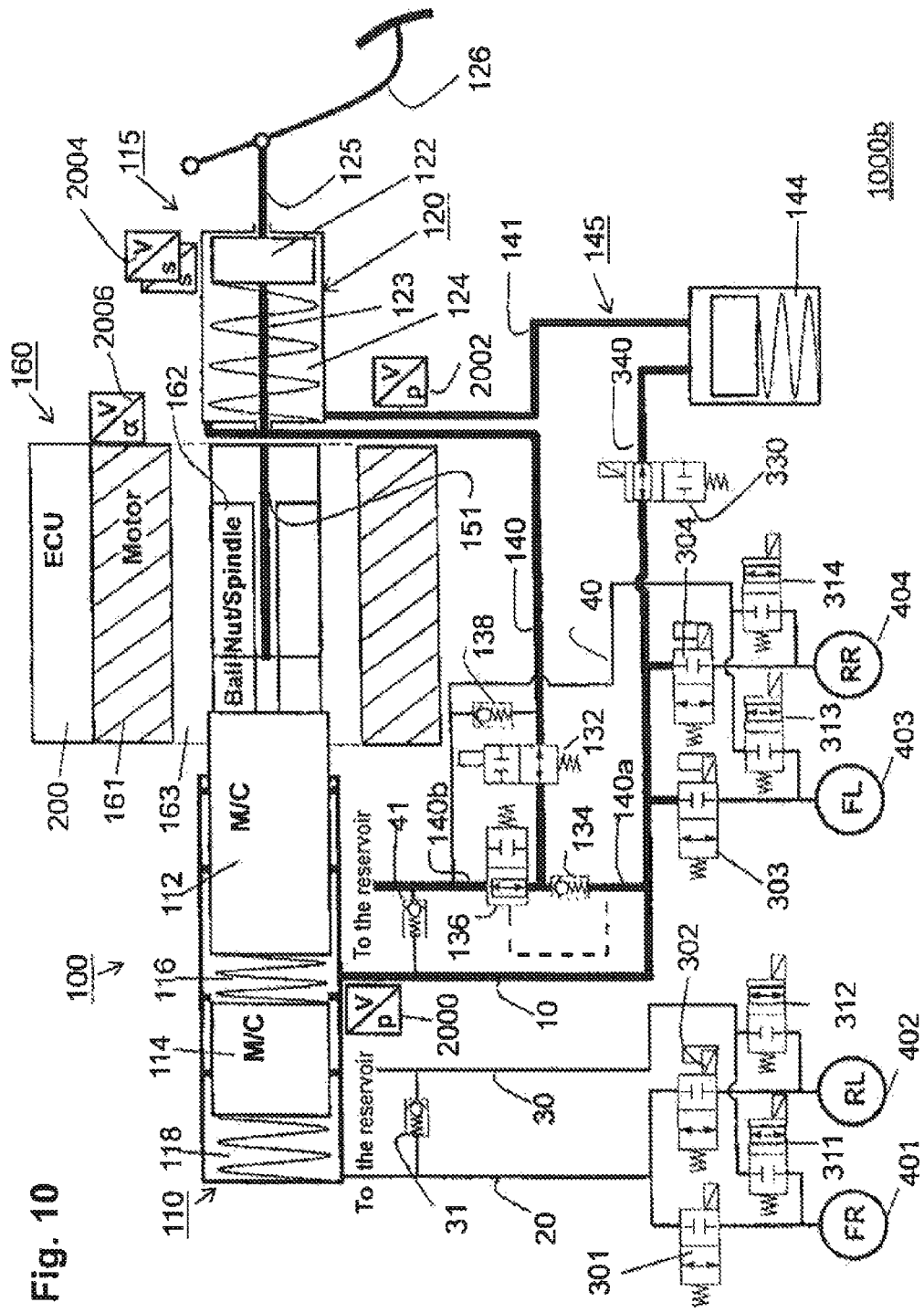
FIG. 10 is the electrohydraulic vehicle brake system according to FIG. 2 for illustrating the ventilation method according to FIG. 8.

A first embodiment of a ventilation of the simulator circuit 145 is shown in FIGS. 9 and 10. In FIG. 9, a corresponding flow chart of the automatic ventilation method is shown. In FIG. 10 the valve switchings and the flow route of the hydraulic fluid with reference to the brake system 1000b shown in FIG. 2 are shown during the ventilation method.

In a first step S210, the third valve unit 301-302 is first switched to a closed valve position, in order to disconnect the wheel brakes 401-404 assigned to the valve units 301-304 hydraulically from the main brake cylinder 110 (or in the case of the hydraulic pressure generator assembly according to WO 2011/141158 A2 from the cylinder-piston arrangement for hydraulic pressure generation).

In a subsequent second step S220, the valve 330 arranged in the first hydraulic fluid path 340 is opened to connect the main brake cylinder 110 fluidically to the simulator circuit 145. Furthermore, the valve 132 arranged in the second hydraulic fluid path 140 is moved into an open valve position unless this valve is already in the open valve position. The switching of the valves 301-304, 340 and optionally of the valve 132 can take place simultaneously or consecutively in time by the ECU 200.

In a following third step S230, the electromechanical actuator 160 is now operated to convey hydraulic fluid from the hydraulic pressure generator. In the variant of the brake system shown in FIG. 2, the actuator 160 actuates the piston arrangement 112, 114 of the main brake cylinder 110. By displacing the piston arrangement 112, 114 of the main brake cylinder 110, hydraulic fluid can only flow from the first chamber 116 of the main brake cylinder 110 via the first brake circuit 10 and via the first fluid path 340 and via the open valve 330 into the simulator circuit 145. With increasing displacement of the piston arrangement 112, 114, the pressure in the test circuit and in the main brake cylinder 110 continues to rise. As soon as the switching pressure of the pressure-controlled pressure relief valve 136 (10 bar) is reached, the valve 136 switches to an open valve position 136. The hydraulic fluid conveyed in the simulator circuit 145 can then flow via the fluid path 141 of the simulator circuit 145, via the hydraulic cylinder 120 of the unactuated brake pedal interface 115 and via the open valves 132 and 136 in the second fluid path back into the hydraulic fluid reservoir 170 (and thus into the main brake cylinder 110 connected to the hydraulic fluid reservoir 170). New hydraulic fluid can be conveyed in this way into the simulator circuit 145 and into the pedal interface 115 without operation of the brake pedal 126 being required for this.

Figure 11:
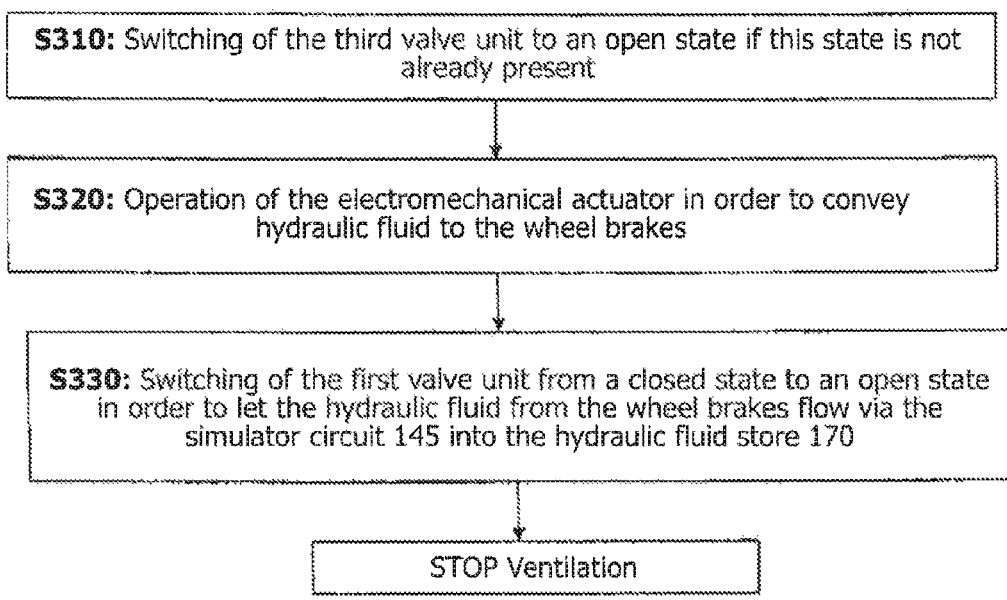
FIG. 11 is a flow chart for illustrating another ventilation method for the vehicle brake systems according to FIGS. 1 and 2.
Figure 12A:
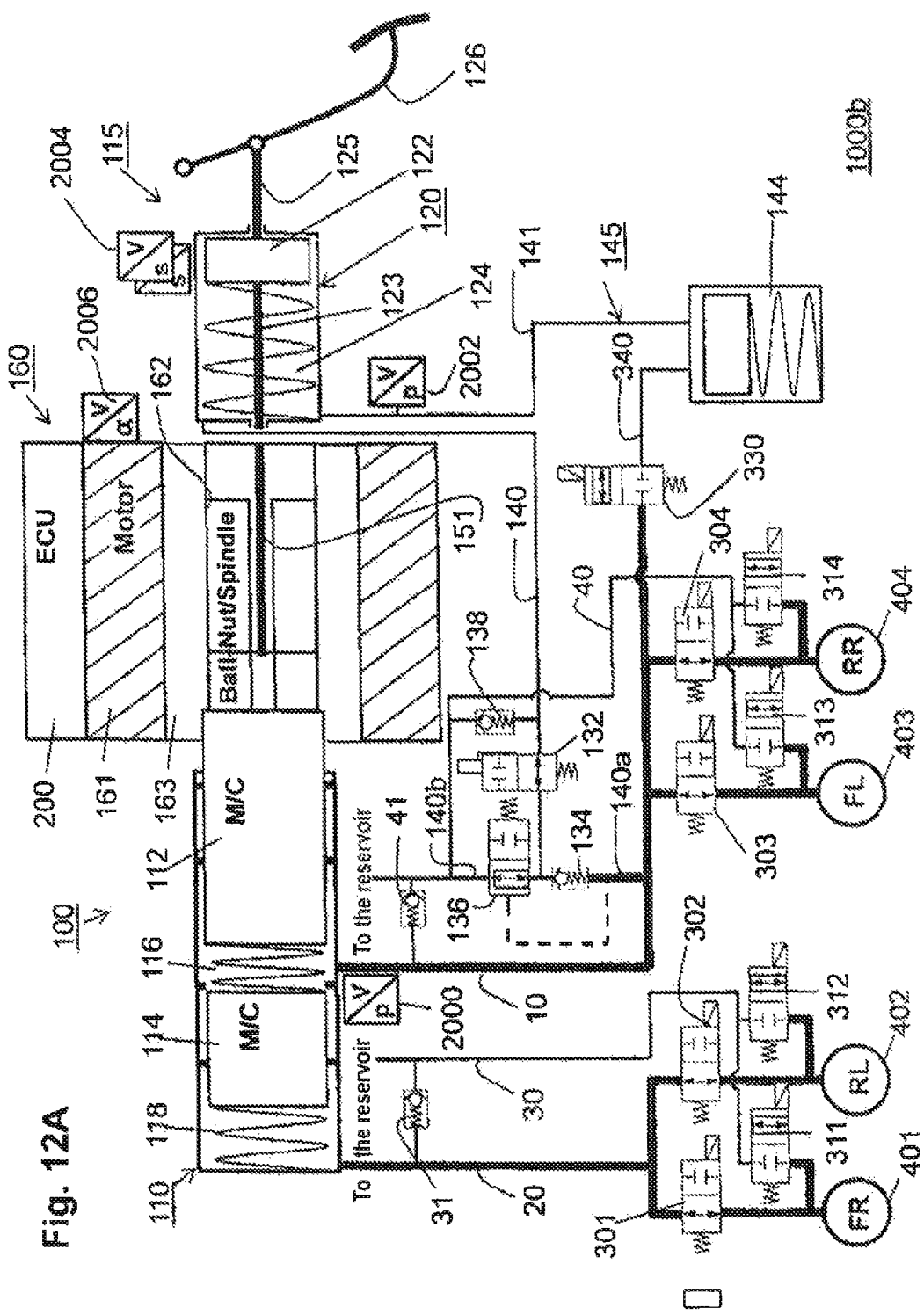
FIG. 12A/12B is the electrohydraulic vehicle brake system according to FIG. 2 for illustrating the ventilation method according to FIG. 11.
Figure 12B:
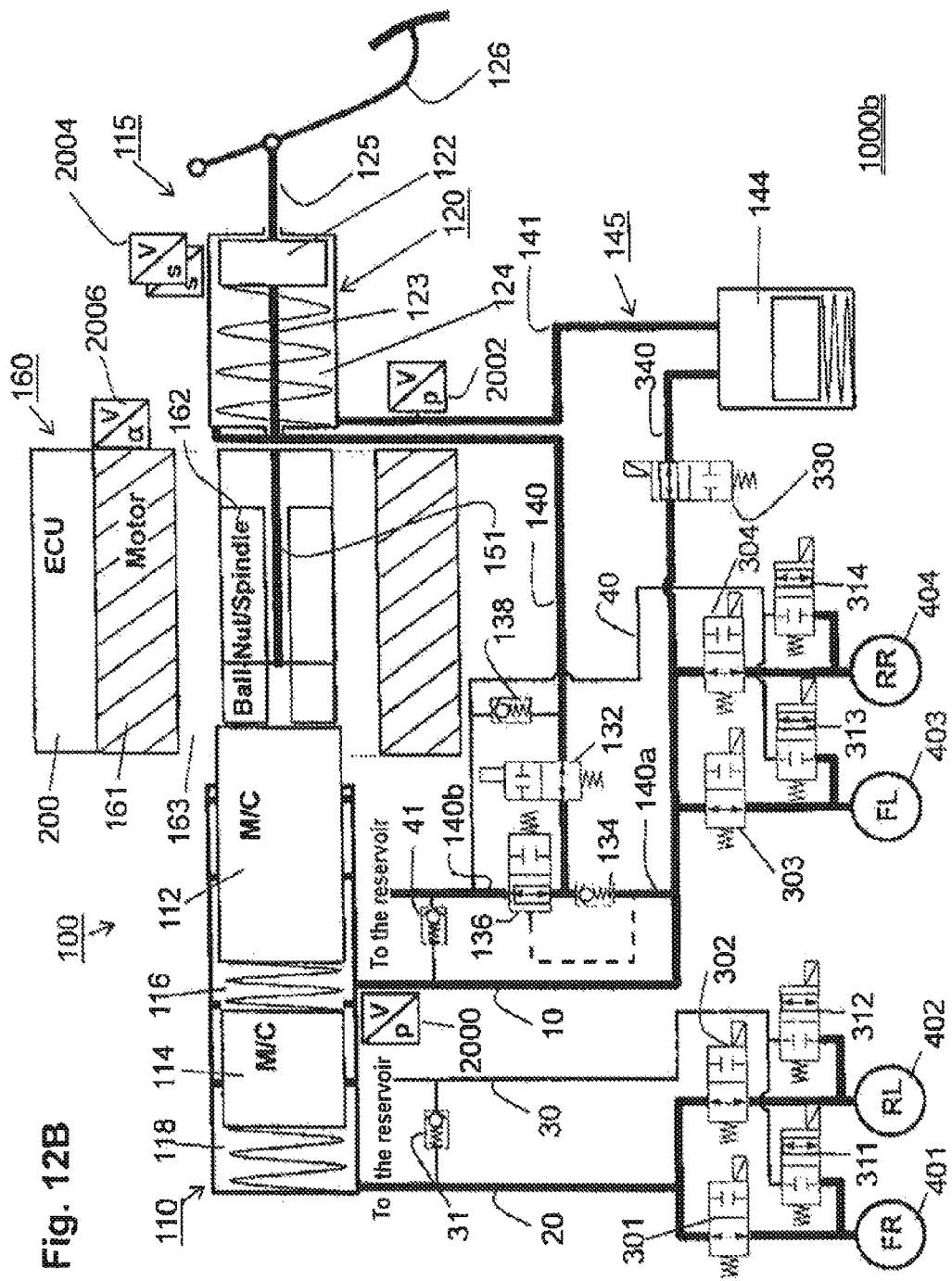

According to an alternative ventilation variant, which is illustrated in FIGS. 11, 12A and 12B, the hydraulic fluid takes the following flow route in the brake system 1000b.

First the valves 301-304 of the third valve unit are switched to an open valve position unless they are already in an open valve position (first step S310). The valve 320 arranged in the first hydraulic fluid path 340 also remains unactuated initially and thus in a blocking position.

Then the actuator 160 is operated (step S320) to convey hydraulic fluid from the main brake cylinder 110 into the wheel brakes 401-404 of the two brake circuits 10, 20 (cf. FIG. 12A, where the route of the displaced hydraulic fluid is represented by thick marking of the fluid paths). The hydraulic fluid displaced from the main brake cylinder 110 can initially only reach the wheel brakes 401-404, which are actuated due to the hydraulic fluid conveyed. The valve 136 is already switched to an open position on account of the pressure present in the main brake cylinder 110. The hydraulic fluid displaced into the wheel brakes 401-404 cannot yet flow to the hydraulic fluid reservoir 170, however, since the valve 330 in the first fluid path 340 is still closed.

The valve 330 is then switched to an open valve position (step 330) to allow the hydraulic fluid to flow from the wheel brakes 401-404 via the two brake circuits 10, 20 and via the first fluid path 340 into the hydraulic pressure accumulator 144 (cf. FIG. 12B, the hydraulic pressure accumulator 144 is filled). From there the hydraulic fluid flows via the fluid path 141 and the hydraulic cylinder 120 of the unactuated pedal interface 115 to the second fluid path 140. The hydraulic fluid displaced from the main brake cylinder 110 can flow back into the fluid reservoir 170 via the second fluid path 140 and via the open valves 132 and 136.

Overall a test circuit is realised by the brake system 1000, 1000a, 1000b described here that is provided for the automatic ventilation of the brake system 1000 and for the testing of valves in the brake system 1000. The test circuit substantially consists of two hydraulic fluid paths different from one another (the first fluid path 340 and second fluid path 140 described above), which fluidically connect the simulator circuit 145 to the hydraulic fluid reservoir 170 on the one hand and to a hydraulic pressure generator (with the main brake cylinder 110 in the embodiments described here) on the other hand. The present test circuit design can easily be integrated into modern brake systems, which operate according to the brake-by-wire principle, as they often already have a hydraulic simulator circuit and a fluidic connection to the hydraulic fluid reservoir 170. Only another fluid path having a valve unit has to be implemented in the brake system 1000, 1000a, 1000b in order to connect the hydraulic pressure generator of the brake system 1000, 1000a, 1000b fluidically to the simulator circuit.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. An electrohydraulic brake system for a vehicle, comprising:
   a hydraulic simulator circuit for generation of a pedal response force;
   a first cylinder-piston device and an electromechanical actuator acting on the first cylinder-piston device for generation of a hydraulic pressure in at least one brake circuit;
   a first fluid path having a first valve unit arranged therein for a selective fluidic connection of the first cylinder-piston device to the simulator circuit;
   a second fluid path having a second valve unit arranged therein for a selective fluidic connection of the simulator circuit to an unpressurised hydraulic fluid reservoir; and
   further comprising a first detection device, which is designed to detect a hydraulic fluid volume displaced by operation of the electromechanical actuator, a second detection device, which is designed to detect a hydraulic pressure built up by operation of the electromechanical actuator, and a comparison device, which is formed to compare both measured variables detected by the first and second detection devices with a set pressure-volume characteristic.

2. The electrohydraulic brake system for a vehicle according to claim 1, further comprising at least one hydraulic brake circuit, wherein the at least one brake circuit is connected fluidically to the first cylinder-piston device.

3. The electrohydraulic brake system for a vehicle according to claim 2, wherein the simulator circuit can be connected fluidically to the first cylinder-piston device via the first fluid path and via the at least one brake circuit.

4. The electrohydraulic brake system for a vehicle according to claim 1, further comprising at least one hydraulic brake circuit and a second cylinder-piston device connected fluidically to the at least one hydraulic brake circuit, wherein the first cylinder-piston device is connected fluidically to the second cylinder-piston device for the generation of hydraulic pressure in the at least one brake circuit.

5. The electrohydraulic brake system according to claim 1, wherein the first valve unit is arranged parallel to the second valve unit.

6. The electrohydraulic brake system according to claim 1, wherein the simulator circuit comprises a hydraulic pressure accumulator, which can be connected fluidically to a brake pedal interface.

7. The electrohydraulic brake system according to claim 1, wherein the first valve unit when unactuated is in a closed state.

8. The electrohydraulic brake system according to claim 1, wherein the second valve unit when unactuated is in an open state.

9. The electrohydraulic brake system according to claim 1, further comprising:
   a control apparatus or a control apparatus system for the electrical activation of the first valve unit and of the electromechanical actuator, wherein the control apparatus or control apparatus system is formed to execute the following steps:
   switching of the first valve unit from a closed state to an open state, in order to connect the simulator circuit fluidically to the first cylinder-piston device; and
   operation of the electromechanical actuator to displace hydraulic fluid from the first cylinder-piston device via the first fluid path into the simulator circuit.

10. The electrohydraulic brake system according to claim 9, wherein the control apparatus or control apparatus system is further formed to switch the second valve unit from an open state to a closed state before hydraulic fluid is displaced into the simulator circuit.

11. The electrohydraulic brake system according to claim 10, wherein the control apparatus or control apparatus system is further formed to open the second valve unit again following displacement of a volume of hydraulic fluid into the simulator circuit, in order to let the volume of hydraulic fluid dammed up in the simulator circuit flow away to the hydraulic fluid reservoir via the second valve unit.

12. The electrohydraulic brake system according to claim 9, wherein the second valve unit remains in an open state during the operation of the electromechanical actuator.

13. The electrohydraulic brake system according to claim 2, further comprising at least a third valve unit arranged in the at least one brake circuit for the selective fluidic connection of a wheel brake to the first cylinder-piston device or to the second cylinder-piston device.

14. The electrohydraulic brake system according to claim 13, further comprising a control apparatus or a control apparatus system for the electrical activation of the first valve unit and of the electromechanical actuator, wherein the control apparatus or control apparatus system is formed to execute the steps of switching of the first valve unit from a closed state to an open state, in order to connect the simulator circuit fluidically to the first cylinder-piston device and operating the electromechanical actuator to displace hydraulic fluid from the first cylinder-piston device via the first fluid path into the simulator circuit and wherein the control apparatus or control apparatus system is further formed to switch the at least one third valve unit from an open state to a closed state before operation of the electromechanical actuator.

15. The electrohydraulic brake system according to claim 13, further comprising a control apparatus or a control apparatus system for the electrical activation of the first valve unit and of the electromechanical actuator, wherein the control apparatus or control apparatus system is formed to execute the steps of switching of the first valve unit from a closed state to an open state, in order to connect the simulator circuit fluidically to the first cylinder-piston device and operating the electromechanical actuator to displace hydraulic fluid from the first cylinder-piston device via the first fluid path into the simulator circuit and wherein the at least one third valve unit remains open during operation of the electromechanical actuator, and the control apparatus or control apparatus system is formed to switch the first valve unit from a closed to an open state following operation of the actuator.

16. A method for checking a functionality of an electrohydraulic brake system for a vehicle, comprising a hydraulic simulator circuit for generation of a pedal response force, a first cylinder-piston device, an electromechanical actuator acting on the first cylinder-piston device for generation of a hydraulic pressure and a first fluid path having a first valve unit arranged therein for a selective fluidic connection of the first cylinder-piston device to the hydraulic simulator circuit, wherein the method comprises the following steps:
  switching of the first valve unit from a closed state to an open state, in order to connect the hydraulic simulator circuit fluidically to the first cylinder-piston device;
  operating the electromechanical actuator to displace hydraulic fluid from the first cylinder-piston device via the first fluid path into the simulator circuit;
  detecting a hydraulic pressure prevailing on account of the displaced hydraulic fluid; and
  checking of the functionality of the electrohydraulic vehicle brake system on the basis of the hydraulic pressure detected;
  detecting the volume of hydraulic fluid displaced during operation of the electromechanical actuator; and
  comparing the pressure detected and the volume of hydraulic fluid detected with a set volume-pressure characteristic.

17. The method according to claim 16, wherein the hydraulic pressure in the first cylinder-piston device and/or in the simulator circuit is detected.

18. The method according to claim 16, wherein the vehicle brake system further comprises a second fluid path having a second valve unit arranged therein for the selective fluidic connection of the simulator circuit to an unpressurised hydraulic fluid reservoir, further comprising the step of:
  switching of the second valve unit from an open state to a closed state before hydraulic fluid is displaced into the simulator circuit in order to dam the displaced hydraulic fluid up in the simulator circuit.

19. The method according to claim 18, further comprising the step of:
  opening of the second valve unit after a volume of hydraulic fluid has been displaced into the simulator circuit in order to let the dammed up hydraulic fluid in the simulator circuit flow away via the second valve unit.

20. The method according to claim 16, wherein the vehicle brake system further comprises a second fluid path having a second valve unit arranged therein for the selective fluidic connection of the simulator circuit to a hydraulic fluid reservoir, wherein a pressure-controlled valve unit is connected downstream of the second valve unit, wherein the second valve unit remains switched to an open state on operation of the actuator in order to displace a hydraulic fluid displaced from the first cylinder-piston device via the first valve unit, the simulator circuit, the second valve unit and via the pressure-controlled valve unit into the hydraulic fluid reservoir.

21. The method according to claim 16, wherein the vehicle brake system comprises at least one brake circuit and at least a third valve unit arranged in the at least one brake circuit, further comprising the step of:
  switching of the third valve unit from an open state to a closed state before the actuator is operated.

22. A method for ventilation of a hydraulic simulator circuit of an electrohydraulic vehicle brake system, comprising a hydraulic simulator circuit for generation of a pedal response force, a first cylinder-piston device, an electromechanical actuator acting on the first cylinder-piston device for generation of a hydraulic pressure in at least one brake circuit, a first fluid path having a first valve unit arranged therein for a selective fluidic connection of the first cylinder-piston device to the simulator circuit and a second fluid path having a second valve unit arranged therein for the selective fluidic connection of the hydraulic simulator circuit to an unpressurised hydraulic fluid reservoir, wherein the method comprises the following steps:
  opening of the first valve unit in order to connect the first cylinder-piston device fluidically to the simulator circuit;
  opening of the second valve unit in order to connect the simulator circuit fluidically to the hydraulic fluid reservoir if the second valve unit was in a closed state;
  operating the electromechanical actuator to displace hydraulic fluid from the first cylinder-piston device via the simulator circuit into the hydraulic fluid reservoir;
  the method further comprising one of the following:
    wherein the vehicle brake system comprises at least one brake circuit that can be connected fluidically to the first cylinder-piston device and at least a third valve unit arranged in the at least one brake circuit, further comprising the step of:
      switching of the third valve unit from an open state to a closed state before the actuator is operated;
    or
    wherein the vehicle brake system comprises at least one brake circuit that can be connected fluidically to the first cylinder-piston device and at least a third valve unit arranged in the at least one brake circuit, wherein the third valve unit assumes an open state on operation of the electromechanical actuator, in order to convey hydraulic fluid into the at least one brake circuit, further comprising the step of:
      opening the first valve unit in order to let the hydraulic fluid stored in the brake circuits flow via the simulator circuit into the fluid reservoir.

23. The method according to claim 16, wherein the method is executed during a brake-operation-free phase.

24. The method according to claim 16, wherein the method is executed independently of the driver.

25. A computer program product, comprising program code means for executing a method according to claim 16 when the computer program runs on a processing unit.

26. The computer program product according to claim 25, which is stored on a computer-readable data carrier.

27. The method according to claim 22, wherein the method is executed during a brake-operation-free phase.

28. The method according to claim 22, wherein the method is executed independently of the driver.

29. A computer program product, comprising program code means for executing a method according to claim 22 when the computer program runs on a processing unit.

* * * * *